United States Patent
Xie et al.

(10) Patent No.: US 10,051,557 B2
(45) Date of Patent: Aug. 14, 2018

(54) METHOD, SYSTEM AND DEVICE FOR HELPING MULTI-MODE TERMINAL DISCOVER COMMUNICATIONS OPPORTUNITIES

(71) Applicant: ZTE Corporation, Shenzhen (CN)

(72) Inventors: Feng Xie, Shenzhen (CN); Bo Dai, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 28 days.

(21) Appl. No.: 14/909,977

(22) PCT Filed: May 16, 2014

(86) PCT No.: PCT/CN2014/077706
§ 371 (c)(1),
(2) Date: Mar. 7, 2016

(87) PCT Pub. No.: WO2014/169872
PCT Pub. Date: Oct. 23, 2014

(65) Prior Publication Data
US 2016/0183174 A1  Jun. 23, 2016

(30) Foreign Application Priority Data
Aug. 5, 2013 (CN) .......................... 2013 1 0337533

(51) Int. Cl.
*H04W 36/00* (2009.01)
*H04W 48/16* (2009.01)
(Continued)

(52) U.S. Cl.
CPC .......... *H04W 48/16* (2013.01); *H04W 24/10* (2013.01); *H04W 36/0066* (2013.01); *H04W 48/12* (2013.01); *H04W 48/18* (2013.01)

(58) Field of Classification Search
USPC .......... 455/436, 434, 23; 370/338, 328, 235
See application file for complete search history.

(56) References Cited

U.S. PATENT DOCUMENTS 8,954,076 B2 * 2/2015 Lim .................. H04W 72/0406
370/252
9,173,139 B2 * 10/2015 Lim .................. H04W 36/0061
(Continued)

FOREIGN PATENT DOCUMENTS

CN    101406090 A    4/2009
CN    102232285 A    11/2011
(Continued)

OTHER PUBLICATIONS

International Search Report in international application No. PCT/CN2014/077706, dated Aug. 5, 2014.
(Continued)

*Primary Examiner* — David Q Nguyen
(74) *Attorney, Agent, or Firm* — Oppedahl Patent Law Firm LLC

(57) ABSTRACT

The present disclosure discloses a method, a device and a system for assisting a multi-mode terminal to discover communication opportunities. The method includes that the multi-mode terminal receives coverage indication information relevant to a second communication mode and transmitted by a network side, and the multi-mode terminal discovers a communication opportunity based on the second communication mode according to the coverage indication information.

19 Claims, 7 Drawing Sheets

(51) Int. Cl.
*H04W 48/18* (2009.01)
*H04W 48/12* (2009.01)
*H04W 24/10* (2009.01)

(56) References Cited

U.S. PATENT DOCUMENTS

| | | | |
|---|---|---|---|
| 9,854,044 B2* | 12/2017 | Kazmi | H04W 76/14 |
| 2007/0224988 A1 | 9/2007 | Shaheen | |
| 2010/0067434 A1* | 3/2010 | Siu | H04W 48/18 |
| | | | 370/328 |
| 2010/0093340 A1 | 4/2010 | Buracchini | |
| 2010/0197223 A1* | 8/2010 | Saito | H04B 7/15507 |
| | | | 455/23 |
| 2011/0158118 A1 | 6/2011 | Chou | |
| 2011/0319085 A1* | 12/2011 | Ishii | H04W 88/06 |
| | | | 455/436 |
| 2012/0250612 A1* | 10/2012 | Jalloul | H04B 7/0805 |
| | | | 370/328 |
| 2013/0083661 A1* | 4/2013 | Gupta | H04W 28/0215 |
| | | | 370/235 |
| 2013/0208700 A1 | 8/2013 | Lim | |
| 2013/0287014 A1* | 10/2013 | Yuk | H04W 88/06 |
| | | | 370/338 |
| 2014/0066061 A1* | 3/2014 | Lou | H04W 48/16 |
| | | | 455/434 |
| 2014/0099949 A1 | 4/2014 | Gödor | |
| 2014/0162656 A1 | 6/2014 | Chai et al. | |

FOREIGN PATENT DOCUMENTS

| | | |
|---|---|---|
| CN | 102833813 A | 12/2012 |
| CN | 102946586 A | 2/2013 |
| CN | 102958079 A | 3/2013 |
| EP | 2720508 A1 | 4/2014 |
| EP | 2736284 A1 | 5/2014 |
| JP | 2008508832 A | 3/2008 |
| JP | 2008514068 A | 5/2008 |
| JP | 2012503432 A | 2/2012 |
| WO | 0038457 A1 | 6/2000 |
| WO | 2004091244 A1 | 10/2004 |
| WO | 2008084621 A1 | 7/2008 |
| WO | 2008084659 A1 | 7/2008 |
| WO | 2012046925 A1 | 4/2012 |
| WO | 2013002693 A1 | 1/2013 |

OTHER PUBLICATIONS

English Translation of the Written Opinion of the International Search Authority in international application No. PCT/CN2014/077706, dated Aug. 5, 2014.

Supplementary European Search Report in European application No. 14785321.2, dated Jun. 24, 2016.

* cited by examiner

METHOD, SYSTEM AND DEVICE FOR HELPING MULTI-MODE TERMINAL DISCOVER COMMUNICATIONS OPPORTUNITIES

TECHNICAL FIELD

The present disclosure relates to mobile communications and in particular to a method, a system and a device for assisting a multi-mode terminal to discover communication opportunities.

BACKGROUND

In a wireless cellular communication system, in order to provide a large range of wireless communication for a multi-mode terminal, there is a need for a wireless communication system to arrange a base station with a large coverage range. Generally, such a base station is called a Macro eNB or a Macro Base Station (BS), and a serving cell thereof is called a Macro Cell. In addition, in view of different demands of users and different use environments, the wireless communication system needs to provide a wireless communication service which makes up for a coverage hole or provide a wireless communication service with higher quality for the users under certain environments or scenes. Therefore, some small base stations or Transmission Points (TP) with small coverage range and lower transmitting power are adopted. The small base stations or transmission points can be either Pico eNB or Pico BS, or Femto eNB or Femto BS, wherein the Femto BS can be also called a Home Node B (HNB) or HeNB, a milli femto-base station or a femto-base station and thus cells that are provided by the pico-base stations and the HNBs are pico cells and femtocells. Nodes corresponding to the small base stations are also called Low Power Nodes (LPN), and cells corresponding to these nodes are also called small cells.

During evolution, the wireless cellular communication system is gradually developed with various radio access or interface technologies, for example, a Global System for Mobile Communications (GSM) and a Code Division Multiple Access (CDMA) in a second-generation mobile communication technology, a Wideband Code Division Multiple Access, a Time Division-Synchronous Code Division Multiple Access (TD-SCDMA), CDMA-2000 and a Worldwide Interoperability for Microwave Access (Wimax) in a third-generation mobile communication technology, and Long Term Evolution (LTE), Long Term Evolution-Advanced (LTE-A) and Wimax2.0 in the evolved third or fourth-generation mobile communication technology. Some technologies have corresponding access network names. For example, the GSM corresponds to a GSM EDGE Radio Access Network (GERAN), the WCDMA and the TD-SCDMA correspond to a UMTS Terrestrial Radio Access Network (UTRAN), and the LTE/LTE-A corresponds to an Evolved UTRAN (E-UTRAN). In addition to the wireless cellular communication system, the wireless communication system further includes a Wireless Local Access Network (WLAN). Since a Wireless Fidelity (WIFI) frequency spectrum is free and a WIFI chip has a low cost, the arrangement and the application of a wireless local Access Point (AP) can provide a cheap radio access and load shunting way for an operator and the users, wherein the AP can be also regarded as a low-power node.

At present, a wireless communication technology is developing towards the fifth generation (5G). The various wireless communication technologies above (including the 5G wireless communication technology and the existing wireless communication technologies) may co-exist for a long time. With the popularization of the multi-mode terminal (which supports a plurality of working carrier frequencies and/or various access radio access or interface technologies), the operator has an opportunity to select the most appropriate AP or serving base station for the multi-mode terminal, thus enhancing the user throughput and simultaneously realizing optimization on network load balance and resource utilization.

To this end, there is a need to provide a mechanism for effectively discovering a communication opportunity between the terminal and the access point or the base station. However, the conventional method for measuring (or scanning) respective carrier frequencies/radio access or interface technologies of the access point or the base station through the terminal will lead to that the multi-mode terminal needs to perform conversion and measurement on a plurality of carrier frequencies and various access radio access or interface technologies, thus causing high power consumption of the terminal, shortening the time of endurance of the terminal and deteriorating the user experience.

In addition, the characteristic that the WIFI communication (such as Internet downloading) is almost free (or the characteristic that the charge of a new-generation communication technology is lower than that of an old communication technology) will encourage the users to have more communication/downloading demands. For example, many users open a webpage or download data only in the places with WIFI access services. However, in the conventional art, real-time measurement executed by a WIFI communication module on whether there is an accessible AP also causes higher power consumption.

SUMMARY

Given the above, the embodiments of the present disclosure are intended to provide a method, a system and a device for assisting a multi-mode terminal to discover communication opportunities.

A method for assisting a multi-mode terminal to discover communication opportunities is provided, which includes:
the multi-mode terminal receives coverage indication information relevant to a second communication mode and transmitted by a network side; and
the multi-mode terminal discovers a communication opportunity based on the second communication mode according to the coverage indication information.

In the solution, the step that the multi-mode terminal receives coverage indication information relevant to a second communication mode and transmitted by the network side includes: the multi-mode terminal receives the coverage indication information transmitted by a serving base station and indicating that a first communication mode and the second communication mode of a multi-mode base station have the same coverage.

In the solution, the method further includes: the multi-mode terminal measures a first communication mode signal of the multi-mode base station.

In the solution, the first communication mode is: a carrier frequency or radio access or interface technology in which the multi-mode terminal is currently working; and the first communication mode signal includes but is not limited to: a synchronous signal, a discovery signal, a reference signal and a beacon; and wherein the second communication mode is: one or multiple carrier frequencies and/or one or multiple radio access or interface technologies other than the first communication mode.

In the solution, the coverage indication information indicating that the first communication mode and the second communication mode of the multi-mode base station have the same coverage is:

information of cells or access points of multiple carrier frequencies and/or multiple radio access or interface technologies of the multi-mode base station, which includes identity information of the base station, and/or geographical position identity information, and/or coverage information; or indicated by identities or the range of identities of the cells/access points which are co-sited or co-covered; or indicated by capability information of the cells/access points; or two or multiple carrier frequencies and/or radio access or interface technologies of the same operator which are co-sited or co-covered.

In the solution, the coverage indication information further indicates a offset value of signal receiving power;

The step that the communication opportunity based on the second communication mode is discovered includes: the multi-mode terminal judges whether to perform communication based on the second communication mode by using the offset value in combination with a first communication mode signal measurement result.

In the solution, the step that the communication opportunity based on the second communication mode is discovered includes:

the multi-mode terminal measures a second communication mode signal according to a result obtained by measuring the first communication mode signal of the multi-mode base station, so as to judge whether to perform communication based on the second communication mode; or, the multi-mode terminal submits a measurement result to the serving base station, and the serving base station configures second communication mode signal measurement for the multi-mode terminal according to the measurement result, and/or switches/redirects the multi-mode terminal to the second communication mode, and/or the network side adopts the first communication mode and the second communication mode to execute joint transmission with the multi-mode terminal; or the multi-mode terminal transmits a message to the serving base station, and the serving base station configures measurement on the second communication mode for the multi-mode terminal, and/or the serving base station judges, according to the message, whether to transmit the message to the multi-mode base station discovered by the multi-mode terminal, wherein the message transmitted from the multi-mode terminal to the serving base station includes at least one of the following information: indication information close to the service range of the second communication mode, the measurement result of the first communication mode signal, and a deduced result of measurement on the second communication mode signal; or the multi-mode terminal automatically selects to adopt the second communication mode for communication; or the multi-mode terminal indicates a user that the second communication mode of the multi-mode base station is serviceable, and executes communication by using the second communication mode according to manual selection from the user.

In the solution, before the step that the multi-mode terminal receives coverage indication information relevant to the second communication mode and transmitted by a network side, the method further includes:

the serving base station acquires information that adjacent base stations are multi-mode base stations or acquires information that a plurality of adjacent cells are co-sited or co-covered through pre-configuration, or through a network management system, or interfaces between the base stations.

In the solution, the coverage indication information relevant to the second communication mode includes a coverage ratio.

In the solution, the coverage ratio is configured to assist the multi-mode terminal or the user to make a subsequent judgment;

a method of the judgment includes at least one of the following steps that:

the multi-mode terminal judges, according to the coverage ratio, whether to start scanning/measurement on the second communication mode signal;

the multi-mode terminal determines, according to the coverage ratio, a period/frequency of the scanning/measurement on the second communication mode signal, and/or determines continuous judgment time for discovering a service area of the second communication mode; and the multi-mode terminal provides the coverage ratio for the user, so that the user can determine whether to start a communication module with a specific radio access or interface technology or mode.

In the solution, the coverage indication information relevant to the second communication mode includes: cell or cell set information; or, carrier frequency information; or frequency band information, carrier frequency information, cell information, service set information and operational network information of the specific radio access or interface technology/mode.

In the solution, the coverage indication information relevant to the second communication mode further includes at least one of the following information:

measurement evaluation parameter information, load information, capability information and energy saving state information.

In the solution, the step that the multi-mode terminal discovers the communication opportunity based on the second communication mode according to the coverage indication information includes:

the coverage indication information is associated in default with the serving cell of the multi-mode terminal, so that the multi-mode terminal discovers a service area of the second communication mode; or if discovering a cell in the coverage indication information or a cell in the cell set, the multi-mode terminal discovers a service area of the second communication mode; or if discovering a carrier frequency indicated in the coverage indication information, the multi-mode terminal discovers a service area of the second communication mode; or the multi-mode terminal judges whether to discover a service area of the second communication mode according to the measurement evaluation parameter information.

In the solution, the multi-mode terminal judges whether to execute communication based on the second communication mode according to the frequency band information, the carrier frequency information, the cell information, the service set information, the operational network information of the specific radio access or interface technology/mode, the load information, the capability information and the energy saving state information.

In the solution, the second communication mode at least includes one of the following modes: WIFI, an IMT-2020 communication radio access or interface technology, a high-frequency band communication carrier frequency/radio access or interface technology, a Frequency Division Duplex (FDD) communication mode and a Time Duplex Division (TDD) communication mode.

A multi-mode terminal is further provided, which includes: a transceiving module and an operating module, wherein, the transceiving module is configured to receive coverage indication information relevant to a second communication mode; and the operating module is configured to discover a communication opportunity based on the second communication mode according to the coverage indication information received by the transceiving module.

In the solution, the transceiving module is specifically configured to receive the coverage indication information transmitted by a serving base station and indicating that a first communication mode and the second communication mode of a multi-mode base station have the same coverage.

In the solution, the multi-mode terminal further includes: a measurement module configured to measure a first communication mode signal of the multi-mode base station; correspondingly, the operating module is further configured to receive a measurement result of the first communication mode acquired by the measurement module.

In the solution, the first communication mode is: a carrier frequency or radio access or interface technology signal which is the same as the current working carrier frequency or radio access or interface technology of the multi-mode terminal, wherein the signal includes but is not limited to: a synchronous signal, a discovery signal, a reference signal and a beacon; and the second communication mode is: one or multiple carrier frequencies and/or one or multiple radio access or interface technologies other than the first communication mode.

In the solution, the coverage indication information indicating that the first communication mode and the second communication mode of the multi-mode base station have the same coverage is:

information of a cell or an access point with multiple carrier frequencies and/or multiple radio access or interface technologies of the multi-mode base station, which includes identity information of the base station, and/or geographical position identity information, and/or coverage information; or indicated by identities or the range of identities of the cells/access points which are co-sited or co-covered; or indicated by capability information of the cells/access points; or two or multiple carrier frequencies and/or radio access or interface technologies of the same operator which are co-sited or co-covered.

In the solution, the operating module is specifically configured to adopt a offset value in combination with measured signal receiving power to judge whether to perform communication with the multi-mode base station based on the second communication mode of the multi-mode base station.

In the solution, the operating module is specifically configured to measure a second communication mode signal according to a result obtained by measuring the first communication mode signal of the multi-mode base station, so as to judge whether to perform communication based on the second communication mode; or, the multi-mode terminal submits a measurement result to the serving base station, and the serving base station configures second communication mode signal measurement for the multi-mode terminal according to the measurement result, and/or switches/redirects the multi-mode terminal to the second communication mode, and/or the network side adopts the first communication mode and the second communication mode to execute joint transmission with the multi-mode terminal; or the multi-mode terminal transmits a message to the serving base station, and the serving base station configures measurement on the second communication mode for the multi-mode terminal, and/or the serving base station judges, according to the message, whether to transmit the message to the multi-mode base station discovered by the multi-mode terminal, wherein the message transmitted from the multi-mode terminal to the serving base station includes at least one of the following information: indication information close to the service range of the second communication mode, the result obtained by measuring the first communication mode signal, and a deduced result of measurement on the second communication mode signal; or the multi-mode terminal automatically selects to adopt the second communication mode for communication; or the multi-mode terminal indicates the user that the second communication mode of the multi-mode base station is serviceable, and executes communication by using the second communication mode according to manual selection result from the user.

In the solution, before the operating module is specifically configured to receive the coverage indication information, the serving base station acquires information that adjacent base stations are multi-mode base stations or acquires information that a plurality of adjacent cells are co-sited or co-covered through pre-configuration, or through a network management system, or through interfaces between the base stations.

In the solution, the coverage indication information includes: a coverage ratio.

In the solution, the operating module is specifically assisted to make a subsequent judgment according to the coverage ratio;

a method of the judgment includes at least one of the following steps:

judging, by the multi-mode terminal, according to the coverage ratio, whether to start scanning/measurement on the second communication mode signal;

determining, by the multi-mode terminal, according to the coverage ratio, a period/frequency of the scanning/measurement on the second communication mode signal, and/or determining continuous judgment time for discovering a service area of the second communication mode; and providing, by the multi-mode terminal, the coverage ratio for the user, so that the user can determine whether to start a communication module with a specific radio access or interface technology or mode.

In the solution, the coverage indication information includes: cell or cell set information; or, carrier frequency information; or frequency band information, carrier frequency information, cell information, service set information and operational network information of the specific radio access or interface technology/mode.

In the solution, the coverage indication information relevant to the second communication mode further includes at least one of the following information: measurement evaluation parameter information, load information, capability information and energy saving state information.

In the solution, a processing module is specifically configured to associate in default the coverage indication information with a serving cell, so that the multi-mode terminal discovers a service area of the second communication mode; or if a cell in the coverage indication information or a cell in the cell set is discovered, discover a service area of the second communication mode; or if a carrier frequency indicated in the coverage indication information is discovered, discover a service area of the second communication mode; or judge whether to discover a service area of the second communication mode according to the measurement evaluation parameter information.

In the solution, the processing module is further configured to judge whether to execute communication based on the second communication mode according to the frequency band information, the carrier frequency information, the cell information, the service set information, the operational network information of the specific radio access or interface technology/mode, the load information, the capability information and the energy saving state information.

In the solution, the second communication mode at least includes one of the following modes: WIFI, an IMT-2020 communication radio access or interface technology, a high-frequency band communication carrier frequency/radio access or interface technology, an FDD communication mode and a TDD communication mode.

A base station is further provided, which includes: a transmitting module configured to transmit coverage indication information relevant to a second communication mode.

In the solution, the transmitting module is specifically configured to transmit the coverage indication information indicating that a first communication mode and the second communication mode of a multi-mode base station have the same coverage; or transmit a coverage ratio of the second communication mode.

A system for assisting a multi-mode terminal to discover communication opportunities is further provided, which includes: a multi-mode terminal and a serving base station, wherein, the multi-mode terminal is the mentioned multi-mode terminal in the abovementioned solution; and the serving base station is the mentioned base station in the abovementioned solution.

According to the method, the system and the device for assisting a multi-mode terminal to discover communication opportunities provided by the embodiments of the present disclosure, the multi-mode terminal can receive coverage indication information transmitted by a serving base station, and discover a communication opportunity according to the coverage indication information, thus avoiding the problem that a subsequent communication operation is completed only by the measurement on multiple frequencies or multiple radio access or interface technologies in the conventional art. The subsequent operation is directly determined according to the co-coverage indication information, thus reducing the power consumption. In addition, the present disclosure can assist the terminal to discover a communication opportunity with a higher priority level or a lower charge more efficiently, thereby further reducing the power consumption.

DETAILED DESCRIPTION

The basic idea of the embodiments of the present disclosure is that: a multi-mode terminal receives coverage indication information relevant to a second communication mode and transmitted by a network side; and the multi-mode terminal discovers a communication opportunity based on the second communication mode according to the coverage indication information.

The present disclosure is further described in detail below in combination with the accompanying drawings and the specific embodiments.

Figure 1:
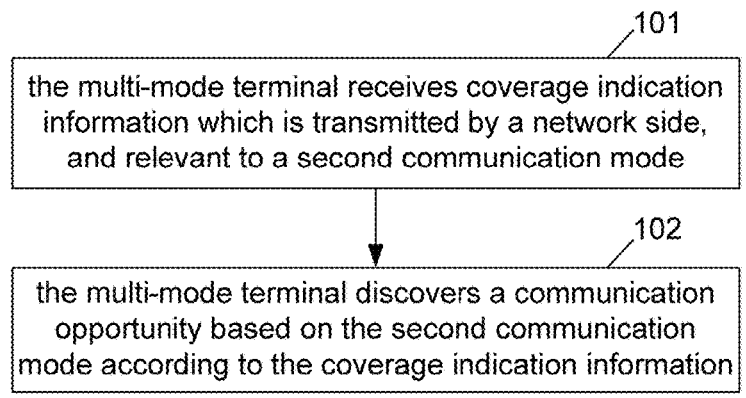
FIG. 1 is a flowchart I showing a method for assisting a multi-mode terminal to discover communication opportunities according to an embodiment of the present disclosure.

An embodiment of the present disclosure provides a method for assisting a multi-mode terminal to discover communication opportunities. As shown in FIG. 1, the method includes the following steps.

Step 101: a multi-mode terminal receives coverage indication information relevant to a second communication mode and transmitted by a network side.

Here, the coverage indication information is configured to indicate that a first communication mode and the second communication mode of a multi-mode base station have the same coverage; or indicate coverage information of a communication radio access or interface technology with a low charge.

The network side may be a serving base station.

Step 102: the multi-mode terminal discovers a communication opportunity based on the second communication mode according to the coverage indication information.

Here, the step of discovering communication opportunity based on the second communication mode may include judging whether to perform communication with a corresponding base station or an access point.

Figure 2:
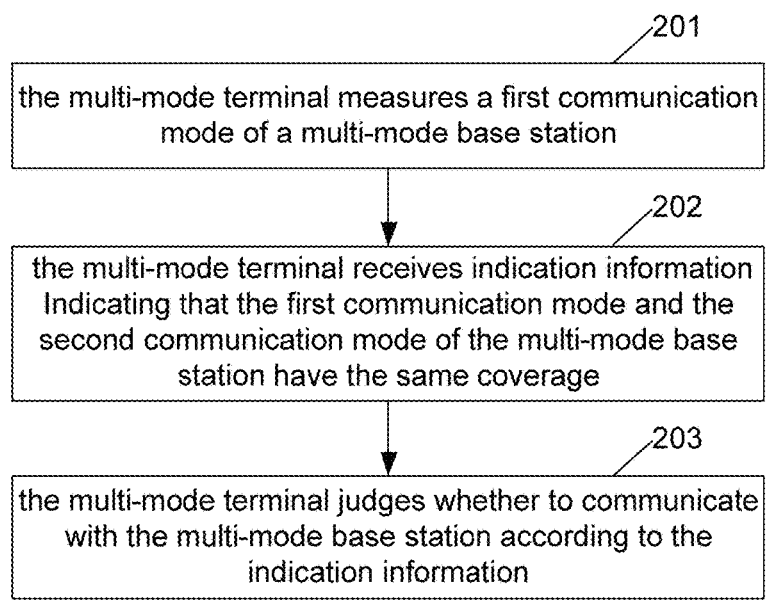
FIG. 2 is a flowchart II showing a method for assisting a multi-mode terminal to discover communication opportunities according to an embodiment of the present disclosure.

When the coverage indication information is configured to indicate that the first communication mode and the second communication mode of the multi-mode base station have the same coverage, a method for assisting a multi-mode terminal to discover communication opportunities, which is provided by an embodiment of the present disclosure, as shown in FIG. 2, includes the following steps.

Step 201: the multi-mode terminal measures a first communication mode of a multi-mode base station.

Here, the first communication mode is a carrier frequency or radio access or interface technology signal which is the same as a current working carrier frequency or radio access or interface technology of the multi-mode terminal; and the signal includes but is not limited to: a synchronous signal, a discovery signal, a reference signal and a beacon.

Step 202: the multi-mode terminal receives coverage indication information indicating that the first communication mode and the second communication mode of the multi-mode base station have the same coverage.

Here, the coverage indication information is indirectly indicated by information of cells of the first communication mode and the second communication mode of the multi-mode base station, or information of access points; the information of the cells or the access points include at least one of the following information: identity of the base station, geographical information and coverage information.

Preferably, co-site or co-coverage of the first communication mode and the second communication mode of the multi-mode base station is indicated through the range of identities of the cells/access points that are co-sited or co-covered.

Preferably, co-site or co-coverage of the first communication mode and the second communication mode of the multi-mode base station is indicated through the capability information of the cells/access points.

Preferably, the communication priority level of the second communication mode is higher than that of the first communication mode.

Before the step that the multi-mode terminal receives coverage indication information, the method further includes: the serving base station acquires information that adjacent base stations are multi-mode base stations or acquires information that a plurality of adjacent cells are co-sited or co-covered through pre-configuration, or through a network management system, or through interfaces between the base stations.

Step 203: the multi-mode terminal judges whether to communicate with the multi-mode base station according to the indication information.

Specifically, the multi-mode terminal receives information configured to indicate a offset value of signal receiving power, and judges whether to prepare communication operation with the second communication mode of the multi-mode base station; or, the multi-mode terminal selects the second communication mode according to a measurement result on the first communication mode of the multi-mode base station to measure the second communication mode, and/or reselect, and/or switch or redirect, and/or connect a radio access or interface technology, and/or a carrier frequency, and/or a cell; or, the multi-mode terminal submits the measurement result to the serving base station, and the serving base station configures second communication mode measurement for the multi-mode terminal according to the measurement result, and/or switches/redirects the multi-mode terminal to the second communication mode, and/or adopts the first communication mode and the second communication mode to execute joint transmission with the multi-mode terminal; or the multi-mode terminal transmits a message to the serving base station, and the serving base station configures measurement on the second communication mode for the multi-mode terminal, and/or the serving base station judges, according to the message, whether to transmit the message to a base station discovered by the multi-mode terminal, wherein the message transmitted from the multi-mode terminal to the serving base station includes at least one of the following information: indication information close to the service range of the second communication mode, the measurement result of the first communication mode signal, and a deduced result of measurement on the cell of the second communication mode; or the multi-mode terminal automatically selects to adopt the second communication mode for communication; or the multi-mode terminal indicates the user that the second communication mode of the multi-mode base station is serviceable, and executes communication by using the second communication mode according to manual selection from the user.

Preferably, after the Step 203, if the second communication mode of the multi-mode base station is an energy-saving state, after preparing to communicate with the second communication mode of the multi-mode base station, the multi-mode terminal activates the second communication mode of the multi-mode base station by itself, or the multi-mode terminal activates the second communication mode of the multi-mode base station through the current serving base station.

Preferably, before the step that the multi-mode terminal prepares to communicate with the second communication mode of the multi-mode base station, the method further includes: the multi-mode terminal compares the measurement result of the first communication mode with that of the second communication mode, reports a comparison result to the current serving base station or the network side, thereby realizing automatic updating of the co-site indication information and/or the offset value.

Figure 3:
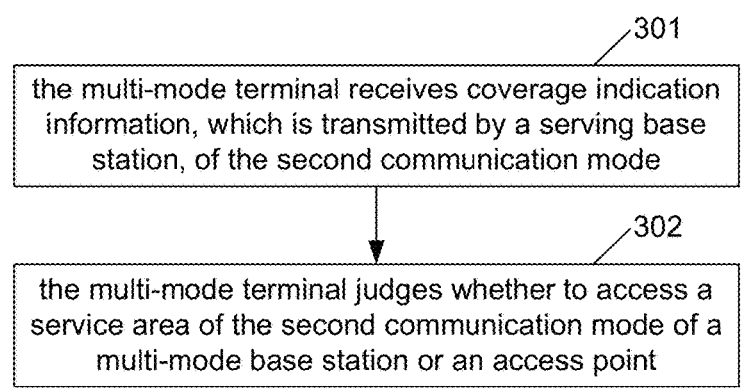
FIG. 3 is a flowchart III showing a method for assisting a multi-mode terminal to discover communication opportunities according to an embodiment of the present disclosure.

When the coverage indication information is information configured to indicate coverage of a communication radio access or interface technology with a low charge, a method for assisting a multi-mode terminal to discover communication opportunities, which is provided by an embodiment of the present disclosure, as shown in FIG. 3, includes the following steps.

Step 301: the multi-mode terminal receives coverage indication information of the second communication mode, which is transmitted by a serving base station.

Here, the second communication mode can be a communication radio access or interface technology with a low charge.

Step 302: the multi-mode terminal judges whether to access a service area of the second communication mode of a multi-mode base station or an access point.

Here, the coverage indication information includes: a coverage ratio.

The coverage ratio is configured to assist the multi-mode terminal or a user to make a subsequent judgment;

a method of the judgment includes at least one of the following steps:

the multi-mode terminal judges, according to the coverage ratio, whether to start scanning/measurement on the second communication mode signal;

the multi-mode terminal determines, according to the coverage ratio, a period/frequency of the scanning/measurement on the second communication mode signal, and/or determines continuous judgment time for discovering a second communication mode service area;

the multi-mode terminal provides the coverage ratio for the user, so that the user can determine whether to start a communication module with a specific radio access or interface technology or mode.

Preferably, the coverage indication information further includes: cell or cell set information; or, carrier frequency information; or, measurement evaluation parameter information; or, frequency band information, carrier frequency information, cell information, service set information, operational network information, load information, capability information and energy saving state information of the specific radio access or interface technology/mode.

Preferably, the step that the multi-mode terminal discovers a service area of a communication radio access or interface technology with a low charge according to the coverage indication information includes: the coverage indication information is associated in default with the serving cell of the multi-mode terminal, so that the multi-mode terminal discovers a service area of the second communication mode; or if discovering a cell in the coverage indication information or a cell in the cell set, the multi-mode terminal discovers a service area of the second communication mode; or if discovering a carrier frequency indicated in the coverage indication information, the multi-mode terminal discovers a service area of the second communication mode; or the multi-mode terminal judges whether to discover a service area of the second communication mode according to the measurement evaluation parameter information.

The multi-mode terminal judges whether to execute communication based on the second communication mode according to the frequency band information, the carrier frequency information, the cell information, the service set information, the operational network information of the specific radio access or interface technology/mode, the load information, the capability information and the energy saving state information.

Preferably, the second communication mode at least includes one of the following modes: WIFI, an IMT-2020 communication radio access or interface technology, a Frequency Division Duplex (FDD) communication mode and a Time Duplex Division (TDD) communication mode.

It can be seen that a radio access or interface technology (such as WIFI, IMT-2020) which has a low charge and a smaller coverage area can be indirectly discovered by a radio access or interface technology which has a high charge and a larger coverage area. It encourages users to consume more service traffic in an area covered by the WIFI or IMT-2020 radio access or interface technology. Meanwhile, the user throughout is enhanced, and optimization on the load balance and the resource utilization is realized.

Figure 4:
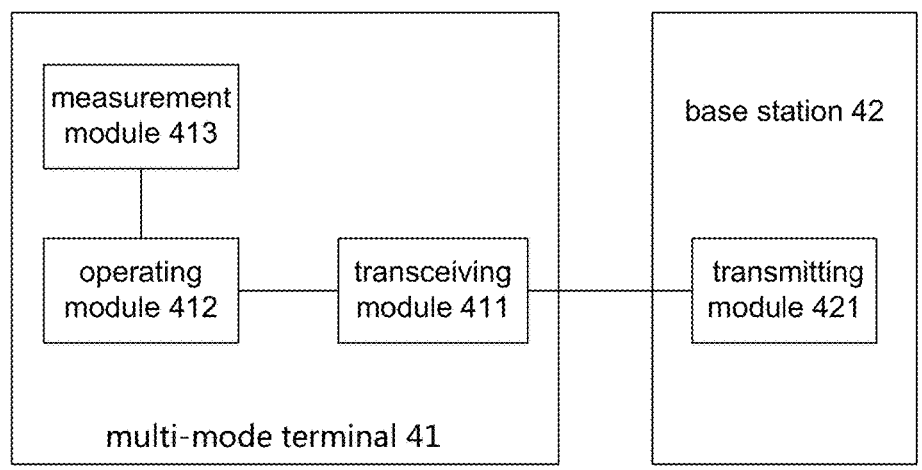
FIG. 4 is a diagram illustrating the structures of a system for assisting a multi-mode terminal to discover communication opportunities according to an embodiment of the present disclosure.

As shown in FIG. 4, an embodiment of the present disclosure provides a system for assisting a multi-mode terminal to discover communication opportunities, which includes: a multi-mode terminal 41 and a base station 42.

The multi-mode terminal 41 is configured to receive coverage indication information relevant to a second communication mode and transmitted by a network side.

The base station 42 is configured to transmit the coverage indication information relevant to the second communication mode to the multi-mode terminal 41.

The multi-mode terminal 41 includes a transceiving module 411 and an operating module 412.

The transceiving module 411 is configured to transmit the received coverage indication information relevant to a second communication mode to the operating module.

The operating module 412 is configured to discover a communication opportunity based on the second communication mode according to the coverage indication information transmitted by the transceiving module.

The transceiving module 411 is configured to receive the coverage indication information transmitted by a serving base station and indicating that a first communication mode and the second communication mode of a multi-mode base station have the same coverage.

The multi-mode terminal 412 is configured to measure a first communication mode signal of the multi-mode base station.

Herein, the first communication mode is: a first carrier frequency or first signal of radio access or interface technology of the multi-mode base station, wherein the first signal of radio access or interface technology includes but is not limited to: a synchronous signal, a discovery signal, a reference signal and a beacon.

The multi-mode terminal 41 further includes: a measurement module 413 configured to measure a first communication mode of the multi-mode base station; correspondingly, the operating module 412 is configured to receive a measurement result, acquired by the measurement module, of the first communication mode.

The coverage indication information is: information of a cell or an access point with multiple carrier frequencies and/or multiple radio access or interface technologies of the multi-mode base station, which includes identity information of the base station and/or geographical position identity information and/or coverage information; or indicated by identities or the range of identities of the cells/access points which are co-sited or co-covered; or indicated by capability information of the cells/access points; or configured to indicate a signal receiving power offset value of this base station/this cell/this access point; or two or multiple carrier frequencies and/or radio access or interface technologies of the same operator which are co-sited or co-covered.

The communication priority level of the second communication mode is higher than that of the first communication mode.

The operating module 412 is configured to measure a second communication mode signal according to a first communication mode signal measurement result on the multi-mode base station, so as to judge whether to perform communication based on the second communication mode; or, submit a measurement result to a serving base station, so that the serving base station configures second communication mode signal measurement for the multi-mode terminal according to the measurement result, and/or switches/redirects the multi-mode terminal to the second communication mode, and/or the network side adopts the first communication mode and the second communication mode to execute joint transmission; or transmit a message to the serving base station, so that the serving base station configures measurement on the second communication mode for the multi-mode terminal, and/or the serving base station judges, according to the message, whether to transmit the message to the discovered multi-mode base station, wherein the message transmitted to the serving base station includes at least one of the following information: indication information close to the range of service of the second communication mode, the measurement result of the first communication mode signal, and a deduced of the second communication mode signal; or automatically select to adopt the second communication mode for communication; or indicate the user that the second communication mode of the multi-mode base station is serviceable, and executes communication with the second communication mode according to a user manual selection result.

Before the operating module 412 is specifically configured to receive the coverage indication information, the serving base station acquires information that adjacent base stations are multi-mode base stations or acquires information that a plurality of adjacent cells are co-sited or co-covered through pre-configuration, or through a network management system, or through interfaces between the base stations.

The operating module 412 is configured to compare the measurement result of the first communication mode with that of the second communication mode, and reports a comparison result.

The operating module 412 is configured to, if the second communication mode is in an energy saving state, activate the second communication mode of the multi-mode base station by itself, or activate the second communication mode of the multi-mode base station through the current serving base station.

The operating module 412 is configured to calculate a measurement result of a cell of the second communication mode of the multi-mode base station according to a measurement result of a cell of the first communication mode of the multi-mode base station, and combine the measurement result with an actual measurement result of the second communication mode of the multi-mode base station; and according to the comparison between the deduced measurement result and the actual measurement result, when a difference is larger than a offset value, transmit a report to the network side, wherein the report includes: the difference between the deduced and the actual measurement result, or a suggested offset value, or an adjustment factor for the offset value, or only a report of an abnormality.

The transceiving module may be implemented by hardware configuration such as an antenna and a Digital Signal Processor (DSP); the operating module and the measurement module may be both implemented by hardware such as the DSP.

The base station 42 includes: a transmitting module 421 configured to transmit the coverage indication information relevant to the second communication mode.

The transmitting module 421 is configured to receive the coverage indication information of a radio access or interface technology with a low charge. A processing module is configured to discover a service area of the radio access or interface technology with a low charge according to the coverage indication information received by the transceiving module.

Preferably, the coverage indication information includes: a coverage ratio; or, cell or cell set information; or, carrier frequency information; or, measurement evaluation parameter information; or, frequency band information, carrier frequency information, cell information, service set information, operational network information of a specific radio access or interface technology/mode, load information, capability information and energy saving state information.

The operating module is configured to make a subsequent judgment under the assist of the coverage ratio.

A method of the judgment includes at least one of the following steps:

judging, by the multi-mode terminal, according to the coverage ratio, whether to start scanning/measurement on the second communication mode signal;

determining, by the multi-mode terminal, according to the coverage ratio, a period/frequency of the scanning/measurement on the second communication mode signal, and/or determining continuous judgment time for discovering a service area of the second communication mode; and providing, by the multi-mode terminal, the coverage ratio for the user, so that the user can determine whether to start a communication module with a specific radio access or interface technology or mode.

Preferably, the processing module is specifically configured to associate the coverage indication information with a serving cell of the multi-mode terminal, so that the multi-mode terminal can discover a service area of a radio access or interface technology with a low charge; or, if discovering a cell in the coverage indication information or a cell in the cell set, the multi-mode terminal discovers a service area of a radio access or interface technology with a low charge; or, if discovering a carrier frequency indicated in the coverage indication information, the multi-mode terminal discovers a service area of a radio access or interface technology with a low charge; or, the multi-mode terminal judges whether to discover a service area of a radio access or interface technology with a low charge according to the measurement evaluation parameter information; or, according to the frequency band information of the specific radio access or interface technology/mode, the carrier frequency information, the cell information, the service set information, the operational network information, the load information, the capability information and the energy saving state information, whether to access the radio access or interface technology/mode is judged.

Preferably, the radio access or interface technology with a low charge at least includes one of the following modes: WIFI, an IMT-2020, a high-frequency band communication carrier frequency/radio access or interface technology, an FDD communication mode and a TDD communication mode.

The base station includes: a transceiving module configured to transmit coverage indication information of a communication radio access or interface technology with a low charge.

Embodiment I

Figure 5:
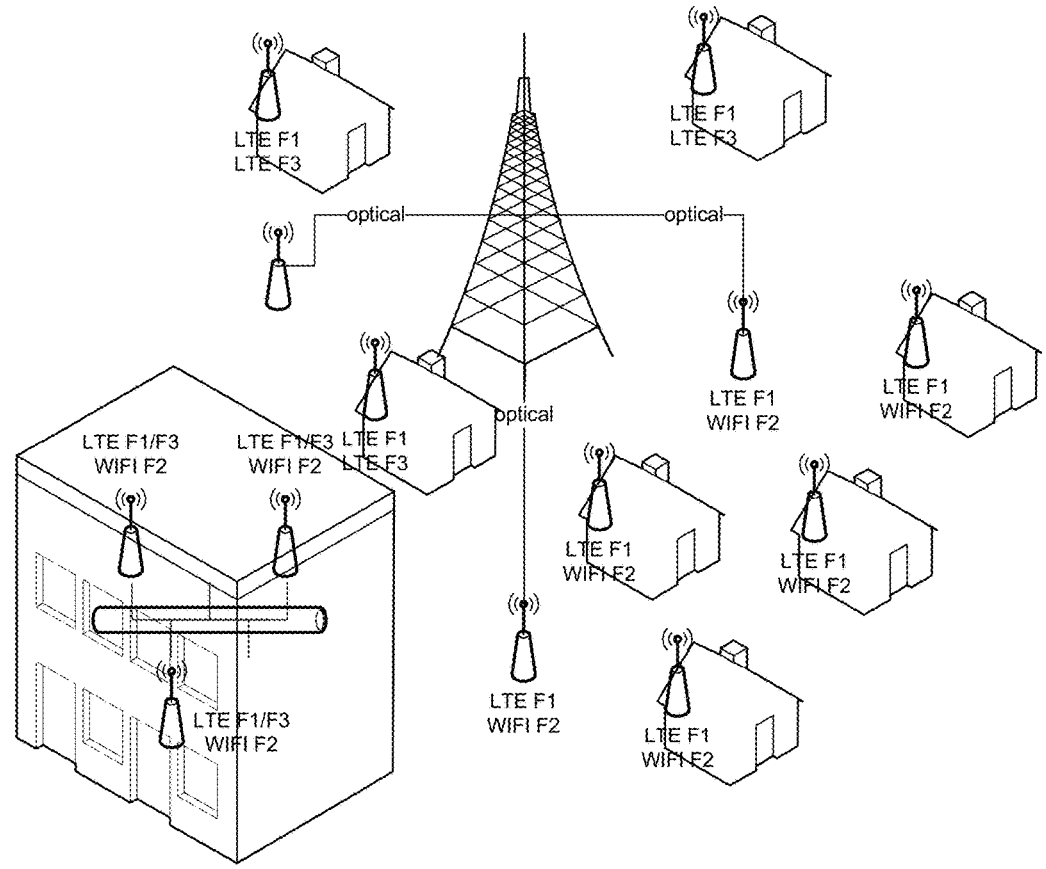
FIG. 5 is a diagram illustrating a heterogeneous network having a multi-mode base station according to the embodiment I and the embodiment II.
Figure 6:
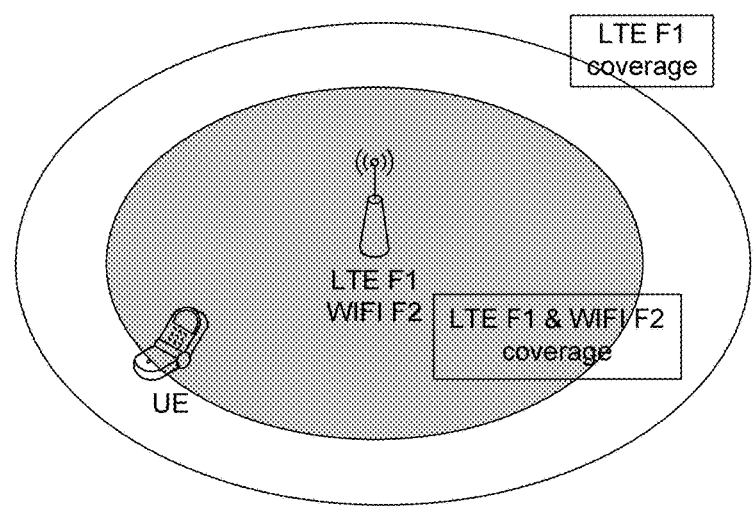
FIG. 6 is a coverage diagram of two communication modes in a multi-mode small base station in the embodiment I and the embodiment II.

As shown in FIG. 5 and FIG. 6, a multi-mode small base station may support a Long-Term Evolution (LTE) radio access or interface technology (including FDD-LTE and/or TDD-LTE) and a Wireless Local Area Network (WLAN) radio access or interface technology (which may possibly support radio access or interface technologies of the second generation, third generation, and/or fifth generation wireless communication technologies). The coverage ranges of different radio access or interface technologies are both affected by the own characteristics (such as characteristics of signals and channels such as pilot frequency/synchronous signals/reference signals/precursor and control channels) of the radio access or interface technologies and affected by the carrier frequencies/frequency bands used by the various radio access or interface technologies (such as 800 Mhz, 1.8 Ghaz, 2.4 GHz, 3.5 Ghz, 5 Ghz and 45 GHz), the surrounding environment and the cell transmitting power.

Generally, the path loss is in direct proportion to the logarithm of the carrier frequency. The higher the carrier frequency/frequency band, the larger the path loss caused by a transmission path of a radio signal passing through the same space, that is, the poorer the coverage or the smaller the coverage range under the same transmitting power. However, the path loss difference caused by two carrier frequencies belonging to the same frequency band or two adjacent carrier frequencies is smaller, so that their coverage ranges are almost the same (when the transmitting powers of the two carrier frequencies are the same).

Under the limitation of the physical size to the multi-mode small base station, generally, the antennas with different carrier frequencies/different radio access or interface technologies are shared, or the distances between the antennas with different carrier frequencies/different radio access or interface technologies are very small, similarly, so is the multi-mode terminal. Thus, the first communication modes (such as LTE 2.3 GHz) and the second communication modes (such as WLAN 2.4 Ghz, or the second generation, third generation and fifth generation wireless communication radio access or interface technologies) of the multi-mode small base station and the multi-mode terminal are similarly equal on the transmission distance, and the transmission environments (such as the indoor environment) are also basically the same.

However, at that moment, the coverage of the two communication modes is mainly affected by the carrier frequencies, the transmitting power, an antenna gain (including an antenna gain of the base station and an antenna gain of the terminal) and the respective signal/channel characteristics.

For the carrier frequencies, the transmitting power, the antenna gain and the signal/channel characteristics of the two given communication modes, co-antenna, or quasi co-site, or quasi co-antenna is implemented, or convertible and equivalent co-site is measured/discovered (co-site or quasi co-site may be considered as a situation of co-coverage or quasi co-coverage).

The coverage ranges of the two communication modes used by a transmission node (the multi-mode small base station) and a co-site receiving node (the multi-mode terminal) have a similarity (such as a circle with the multi-mode small base station serving as a circle centre and having a same radius or different radiuses). That is, coverage of another communication mode can be calculated according to coverage of one communication mode.

For example, when the terminal enters the coverage range of the LTE 2.3 GHz of the multi-mode small base station, the coverage range of the WLAN 2.4 GHz (and/or other communication radio access or interface technologies and/or communication carrier frequencies) of the multi-mode small base station where the terminal enters can be similarly calculated, thus, under the condition of avoiding or minimizing WLAN scanning/measurement (and/or other communication radio access or interface technologies and/or communication carrier frequencies), an opportunity that the multi-mode terminal and the multi-mode small base station communicate with each other by the WLAN 2.3 GHz (and/or other communication radio access or interface technologies/communication carrier frequencies) is discovered.

It means that by virtue of comparison, a less costly communication mode (such as a communication mode with a larger coverage range, or a communication mode with the same frequency as the current working carrier frequency of the multi-mode terminal, or a specific discovering signal, a discovering carrier frequency) can be easily measured/discovered, or a less costly communication mode can be measured/discovered, and a greater costly communication mode (such as a communication mode with a frequency/radio access or interface technology different from the current working carrier frequency/radio access or interface technology of the multi-mode terminal, and/or a communication mode with a smaller coverage range) which is difficultly measured/discovered can be discovered, or measured/discovered. A communication mode with a higher priority level can be discovered by a communication mode with a lower priority level. For example, the WLAN or the fifth-generation wireless communication technology is discovered by 3G or LTE. It also means that communication opportunities with various communication modes can be discovered by virtue of the measurement on a certain communication mode.

Figure 7:
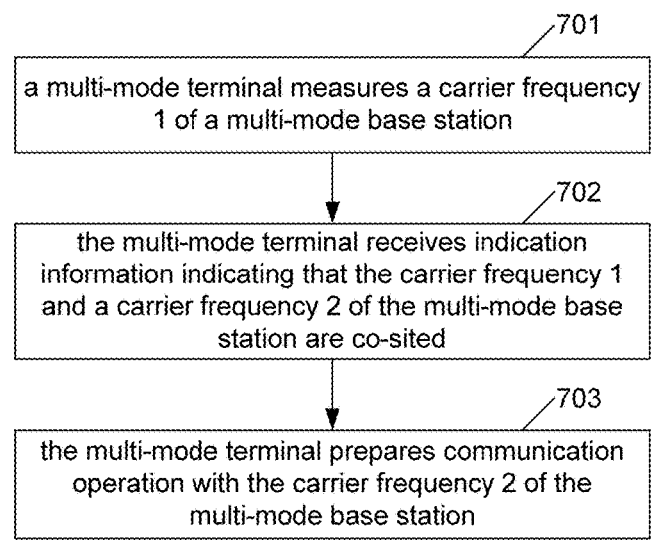
FIG. 7 is a flowchart showing that User Equipment (UE) discovers a communication opportunity in a second communication mode of a multi-mode base station in the embodiment I.

Specifically, according to a flowchart that a multi-mode terminal discovers a communication opportunity in a second communication mode of a multi-mode base station, as shown in FIG. 7, the following steps are included.

Step 701: a multi-mode terminal measures a carrier frequency 1 of a multi-mode base station.

Step 702: the multi-mode terminal receives indication information that the carrier frequency 1 and a carrier frequency 2 of the multi-mode base station are co-sited.

The sequences of the step 701 and the step 702 can be exchanged.

Step 703: the multi-mode terminal prepares communication operation with the carrier frequency 2 of the multi-mode base station.

Preferably, when the multi-mode terminal in the Step 701 is located in the coverage range of the multi-mode base station, and when the multi-mode terminal in an Idle state or a connected state (for example LTE and WLAN dual modes, TDD-LTE/FDD-LTE and WLAN triple modes, LTE/WLAN and 5G triple modes) is located in a service area of the LTE carrier frequency 1 of the multi-mode base station:

the step that the multi-mode terminal measures a carrier frequency 1 of the multi-mode base station includes: the multi-mode terminal measures a signal of the LTE carrier frequency 1 of the multi-mode base station, wherein the signal includes: a synchronous signal of cells (such as a Primary Synchronous Signal (PSS), a Secondary Synchronous Signal (SSS) and a preamble) and/or a Discovery Signal (DS) and/or a reference signal (such as a Cell Reference Signal (CRS), a Channel State Information Reference Signal (CSI-RS), a Demodulation Reference Signal (DMRS) and a Positioning Reference Signal (PRS), and/or a beacon (such as the beacon of the WLAN). Herein, the DS may be transmitted by the multi-mode base station. The multi-mode base station does not provide a data transmission service on the carrier frequency 1, but provides a normal service on the carrier frequency 2 /radio access or interface technology 2 . In addition, when the multi-mode base station transmits the DS on the carrier frequency 1, the carrier frequency 2 /radio access or interface technology 2 may be in an energy saving state.

For example, by virtue of measurement on the CRS, Reference Signal Receiving Power (RSRP) is obtained, or by virtue of measurement on the CSI-RS, CSI-RSRP is obtained, or by virtue of measurement on the WLAN beacon, an RSSI is obtained.

The step that the multi-mode terminal receives indication information that the carrier frequency 1 and a carrier frequency 2 of the multi-mode base station are co-sited may include: the multi-mode terminal receives a system message (or a public channel) transmitted by a cell (that is, this cell), corresponding to a serving cell through the LTE carrier frequency 1.

Herein, the system message includes: a carrier frequency and/or a radio access or interface technology of a cell/access point co-sited or co-covered by public channel indication, for example, carrier frequency information of an Evolved Universal Terrestrial Radio Access Network (E-UTRAN) (which is expressed by an E-UTRAN Absolute Carrier Frequency Number (EARFCN)), WLAN and selectable carrier frequency information, and fifth-generation wireless communication technology and selectable carrier frequency information.

The indication information that the carrier frequency 1 and a carrier frequency 2 of the multi-mode base station are co-sited received by the multi-mode terminal may also be: indirect information indication. For example, the multi-mode terminal acquires information of a plurality of carrier frequencies and/or a plurality of radio access or interface technologies of the multi-mode base station or information of access points of a plurality of carrier frequencies and/or a plurality of radio access or interface technologies.

Herein, the information may include: identity of the base station, and/or geographical position (identity) information, and/or coverage information, which is equivalent to the feature that the multi-mode terminal acquires information that a plurality of carrier frequencies and/or a plurality of radio access or interface technologies of the multi-mode base station are co-sited.

Preferably, the system message or the public channel (for example a broadcasting channel and a control channel) transmitted by the multi-mode base station may further indicate network information, such as Public Land Mobile Network Identity (PLMN-ID) and a Service Set (SS) of the WLAN (which is expressed by a Service Set Identity (SSID)), corresponding to cells or access points of a plurality of carrier frequencies and/or a plurality of radio access or interface technologies.

Preferably, the system message or the public channel transmitted by the multi-mode base station may further indicate identities of cells or access points, such as E-UTRAN cells 1 (which is expressed by a Physical Cell Identity (PCI) and/or a Cell Global Identity (CGI)), a WLAN Basic Service Set (BSS) (which is expressed by a Basic Service Set Identity (BSSID)), and an identity of a 5G cell, of a plurality of carrier frequencies and/or a plurality of radio access or interface technologies.

Preferably, the indication information transmitted by the multi-mode base station further includes: system information of other radio access or interface technologies/carrier frequencies and the like, so that the multi-mode terminal may access to other radio access or interface technologies more quickly or judges whether to access to other radio access or interface technologies/other carrier frequencies/other cells more quickly; or the system introduces priority level indication information, so that the multi-mode terminal selects an access network, to adjust a network load.

Preferably, in addition to indicate the carrier frequencies and/or radio access or interface technologies of cells/access points co-sited or co-covered (by this cell), the system message of the cell further include: information or a public channel which indicate a carrier frequency and/or a radio access or interface technology of a cell/an access point, which is co-sited or co-covered (by this cell), of the same operator.

The step that the multi-mode terminal receives indication information that the carrier frequency 1 and a carrier frequency 2 of the multi-mode base station are co-sited is to: indicate the capability of this base station/this cell/this access point through the contents of the system message or the public channel of the multi-mode base station, for example: indicate that this cell has the communication capability of the carrier frequency 2 /radio access or interface technology 2 ; or indicate a received signal power offset value (such as −3 dB) base station/this cell/this access point. Preferably, the received signal power offset value may not be indicated, for example, under the condition that the coverage difference between the current carrier frequency and the co-sited carrier frequency/radio access or interface technology is small, or the terminal will further scan/measure the co-sited carrier frequency/radio access or interface technology, the multi-mode terminal judges whether to prepare the communication operation with the carrier frequency 2 of the multi-mode base station according to the measured signal receiving power.

The step that the multi-mode terminal prepares the communication operation with the carrier frequency 2 of the multi-mode base station is that: the multi-mode terminal calculates a calculation result according to the received signal receiving power offset value and self-measured signal receiving power, and compares the calculation result with a preset threshold value; if the calculation result is greater than the threshold value, the multi-mode terminal starts to judge whether to prepare the communication operation with the carrier frequency 2 of the multi-mode base station, thereby making up for the coverage difference (which may be either caused by the path loss of different carrier frequencies or caused by different gains of different antennas corresponding to different carrier frequencies/radio access or interface technologies and the like) between the current carrier frequency and the co-sited carrier frequency/radio access or interface technology.

Preferably, the step that the multi-mode terminal prepares the communication operation with the carrier frequency 2 of the multi-mode base station may further include the operations below: in the multi-mode terminal, its own communication module indicates the carrier frequency 2 /radio access or interface technology 2 (serviceable) to corresponding application software; correspondingly, the application software indicates the carrier frequency 2 /radio access or interface technology 2 (serviceable) to a user interface, and automatically selects the carrier frequency 2 /radio access or interface technology 2 or selects the carrier frequency 2/radio access or interface technology 2 (serviceable) manually for communication. For example, the multi-mode terminal indicates a WLAN (serviceable) to a user, so the user can manually switch on a WLAN module for WLAN communication, thus reducing the communication cost, increasing the ratio, and achieving a better user experience.

Preferably, the step that the multi-mode terminal prepares the communication operation with the carrier frequency 2 of the multi-mode base station may further include the operations below: the multi-mode terminal adopts the carrier frequency 2 and/or the radio access or interface technology 2 for measurement or scanning, so as to discover and identify a cell/an access point of the carrier frequency 2 and/or the radio access or interface technology 2 more accurately. For example, the multi-mode terminal measures or scans the co-sited or co-covered carrier frequency/radio access or interface technology indicated by the system message, so as to discover and identify a cell of F2 of the E-UTRAN, and/or discover and identify an access point of F3 of the WLAN, and/or discover and identify a base station/a cell of F4 of the 5G.

Preferably, when measuring or scanning the carrier frequency 2, the multi-mode terminal may perform initial synchronous timing on measurement or scanning of the cell or the access point of the carrier frequency 2 and/or the radio access or interface technology 2 based on synchronous timing of the cell of the carrier frequency 1, so as to accelerate the measurement or scanning progress.

Preferably, when measuring or scanning the carrier frequency 2 and/or the radio access or interface technology 2, the multi-mode terminal may deduce a measurement result of the cell of the carrier frequency 2 and/or the radio access or interface technology 2 according to a measurement result of the cell of the carrier frequency 1, or combine the deduced measurement result with an actual measurement result (such as weighted average), so as to accelerate the measurement speed and reduce the measurement delay or obtain a more accurate measurement value.

Preferably, after Step 703, according to the comparison of the deduced measurement result with the actual measurement result or the comparison of the measurement result of the carrier frequency 1 with the actual measurement result of the carrier frequency 2 and/or the radio access or interface technology 2, for example, if a difference between the measurement result and the actual measurement result is greater than an offset value, the multi-mode terminal reports the difference, or a suggested offset value, or a further adjustment factor delta of the offset value, or only an abnormality to a base station or a network side, so as to adjust the offset value by the base station or the network side, and update co-sited indication information.

Preferably, after the step that the multi-mode terminal discovers the cell of F2 of the E-UTRAN and/or the access point of F3 of the WLAN, the method further includes: the multi-mode terminal can select or reselect a service carrier frequency. The multi-mode terminal may further reports the measurement result of the carrier frequency 2 and/or the radio access or interface technology 2 to a serving base station, so that the service base station can perform switching/redirecting preparation, in order to finally perform data transmission through the carrier frequency 2 and/or the radio access or interface technology 2, for example switching/redirecting to the second communication mode, and/or performing coordinative transmission with the first communication mode and the second communication mode (for example, coordinative multi-point CoMP transmission) or joint transmission (for example double-channel or multi-channel transmission).

Embodiment II

Under the condition that a multi-mode terminal is located in a service area of a Macro base station co-sited with a multi-mode small base station, there is a multi-mode terminal (for example LTE and WLAN dual modes, TDD-LTE/FDD-LTE and WLAN triple modes, LTE/WLAN and 5G triple modes) in a connected state or an idle state and a multi-mode base station in a coverage area of the Macro base station.

Step 801: the Macro base station acquires information that adjacent base stations are multi-mode base stations or acquires information that a plurality of adjacent cells are co-sited or co-covered through pre-configuration, or through a network management system (OAM), or through interfaces between the base stations (such as direct X2 interfaces between the base stations, or indirect X2 interfaces between X2 GW, or indirect S1 interfaces between MME).

Step 802: the multi-mode terminal receives an indication message (such as a system message, a public channel message, an RRC reconfiguration message, an NAS message and an OMA-DM protocol message) transmitted by a network side (such as a cell or a serving cell corresponding to the Macro base station through the LTE carrier frequency 1, or an access network topological relation providing entity).

Herein, the indication message may indicate carrier frequency information of 2 or more co-sited or co-covered (cells/access points) carrier frequencies and/or radio access or interface technologies, for example, (co-sited) E-UTRAN, WLAN and selectable carrier frequency information, and fifth-generation wireless communication technology and selectable carrier frequency information.

Preferably, the information, which is acquired by the multi-mode terminal, of co-site of a plurality of carrier frequencies and/or a plurality of radio access or interface technologies of the multi-mode base station may be an indirect indication. For example, the multi-mode terminal acquires information of cells of a plurality of carrier frequencies and/or a plurality of radio access or interface technologies of the multi-mode base station, or information of access points of a plurality of carrier frequencies and/or a plurality of radio access or interface technologies of the multi-mode base station.

Herein the indication includes: identity of the base station and/or geographical location (identity) information and/or coverage information. Based on the above, the multi-mode terminal can determine co-site or co-coverage of cells of a plurality of carrier frequencies and/or a plurality of radio access or interface technologies.

The indication may further indicate: network information, such as a PLMN-ID and an SS of the WLAN (which is expressed by an SSID), corresponding to a plurality of carrier frequencies and/or a plurality of radio access or interface technologies.

The indication may further include: an indication of the identity range of the co-sited or co-covered cells/access points, for example an E-UTRAN cell group 1 (which is expressed by PCI_range and/or CGI_range), a WLAN BSS (which is expressed by BSSID_range), a 5G cell group 2 and the like.

The indication may further include: information configured to a plurality of carrier frequencies and/or a plurality of radio access or interface technologies of the multi-mode terminal through an RRC signalling, so that the multi-mode terminal can access to other radio access or interface technologies more quickly; or the system introduces priority level indication information, so that the multi-mode terminal selects an access network to adjust network load.

The indication may be further configured to: in addition to two or more co-sited or co-covered carrier frequencies and/or radio access or interface technologies (of cells/access points), indicate two or more co-sited or co-covered carrier frequencies and/or radio access or interface technologies (of cells/access points) of the same operator; or indicate the capability of the base station/the cell/the access point. For example, indicate that the cell (or the cell group) of the carrier frequency 1 /radio access or interface technology 1 has the communication capability with the carrier frequency 2 /the radio access or interface technology 2.

The indication is further configured to indicate a signal receiving power offset value (such as −3 dB) via a system message or an RRC reconfiguration message.

Step 803: the multi-mode terminal works at the LTE carrier frequency 1 at present, and receives a synchronous signal on the carrier frequency 1 of the LTE radio access or interface technology of the multi-mode base station (such as a PSS, an SSS and a preamble), and/or a DS, and/or a reference signal (such as a CRS, a CSI-RS, a DMRS and a PRS), and/or a beacon (such as the beacon of the WLAN); for example, by virtue of measurement on discovery signal, the multi-mode terminal obtains Discovery Signal Receiving Power (DSRP); by virtue of measurement on the CRS, the multi-mode terminal obtains RSRP, or by virtue of measurement on the CSI-RS, the multi-mode terminal obtains CSI-RSRP.

Step 803 and Step 802 can be performed simultaneously.

Step 804: the multi-mode terminal combines the offset value with the measured signal receiving power to judge whether to prepare communication operation with the carrier frequency 2 of the multi-mode base station, so as to make up for a coverage difference between the current carrier frequency and the co-sited carrier frequency/radio access or interface technology.

Preferably, the offset value may be not indicated, for example, under the condition that the coverage difference between the current carrier frequency and the co-sited carrier frequency/radio access or interface technology is small, or the terminal will further scan/measure the co-sited carrier frequency/radio access or interface technology, the multi-mode terminal judges whether to prepare the communication operation with the carrier frequency 2 of the multi-mode base station according to the measured signal receiving power.

Preferably, the step that the multi-mode terminal prepares the communication operation with the carrier frequency 2 of the multi-mode base station may further include the operations below: an communication module of the multi-mode terminal indicates the carrier frequency 2 /radio access or interface technology 2 (serviceable) to application software; correspondingly, the application software further indicates the carrier frequency 2 /radio access or interface technology 2 (serviceable) to a user interface, and automatically selects the carrier frequency 2 /radio access or interface technology 2 or selects the carrier frequency 2/radio access or interface technology 2 (serviceable) manually for communication. For example, the multi-mode terminal indicates a WLAN (serviceable) to a user, so the user can manually switch on a WLAN module for WLAN communication, thus reducing the communication cost, increasing the ratio, and achieving a better user experience.

Preferably, the step that the multi-mode terminal prepares the communication operation with the carrier frequency 2 of the multi-mode base station may further include the operations below: the multi-mode terminal adopts the carrier frequency 2 and/or the radio access or interface technology 2 for measurement or scanning, so as to discover and identify a cell or an access point of the carrier frequency 2 and/or the radio access or interface technology 2 more accurately.

Preferably, whether to measure or scan the carrier frequency 2 and/or the radio access or interface technology 2 may be indicated by a multi-mode base station. For example, the multi-mode terminal measures or scans co-sited or co-covered carrier frequency/radio access or interface technology according to the carrier frequency/radio access or interface technology indicated by a system message or an RRC reconfiguration message (such as included measurement configuration information), so as to discover and identify a cell of F2 of the E-UTRAN, and/or discover and identify an access point of F3 of the WLAN, and/or discover and identify a cell of F4 of 5G.

Preferably, when measuring or scanning the carrier frequency 2, the multi-mode terminal may perform initial synchronous timing on measurement or scanning of the cell or the access point of the carrier frequency 2 and/or the radio access or interface technology 2 based on synchronous timing of the cell of the carrier frequency 1, so as to accelerate the measurement or scanning progress.

Preferably, when measuring or scanning the carrier frequency 2 and/or the radio access or interface technology 2, the multi-mode terminal may deduce a measurement result of the cell of the carrier frequency 2 and/or the radio access or interface technology 2 according to a measurement result of the cell of the carrier frequency 1, or combine the deduced measurement result with an actual measurement result (such as weighted average), so as to accelerate the measurement speed and reduce the measurement delay or obtain a more accurate measurement value.

Preferably, according to the comparison of the deduced measurement result with the actual measurement result or the comparison of the measurement result of the carrier frequency 1 with the actual measurement result of the carrier frequency 2 and/or the radio access or interface technology 2, for example, if a difference between the measurement result and the actual measurement result is greater than a offset value, the multi-mode terminal reports the difference, or a suggested offset value, or a further adjustment factor delta of the offset value, or only an abnormality) to a base station or a network side, so as to adjust the offset value by the base station or the network side, and update co-sited indication information.

Preferably, the multi-mode terminal can further identify a cell or a base station more accurately according to a signal characteristic of a multi-mode base station on the carrier frequency 1 and a signal characteristic of the multi-mode base station on the carrier frequency 2; for example, when a plurality of cells have the same physical cell identities on the carrier frequency 2, different base stations and different cells can be accurately identified according to differences of signals on the carrier frequencies 1 of their own multi-mode base stations (such as indexes or physical identities of synchronous signals or discovery signals).

Preferably, after accurately identifying the cell of F2 of the E-UTRAN and/or the access point of F3 of the WLAN, the multi-mode terminal can select or reselect a service carrier frequency. The multi-mode terminal may further report a measurement result of the carrier frequency 2 and/or radio access or interface technology 2 to a serving base station, so that the serving base station can prepare switching, in order to finally perform probable data transmission through the carrier frequency 2 and/or radio access or interface technology 2.

Preferably, the step that the multi-mode terminal prepares the communication operation with the carrier frequency 2 of the multi-mode base station may further include the operation below: the multi-mode terminal indicates a service range (proximity indication) (probably) close to the carrier frequency 2 and/or radio access or interface technology 2 to a serving base station, so that the serving base station can further configure measurement on the carrier frequency 2 and/or radio access or interface technology 2 for the multi-mode terminal.

And/or, the multi-mode terminal submits a measurement result of the cell of the carrier frequency 1, so that the Macro base station judges whether to request the multi-mode terminal to measure the carrier frequency 2 and/or radio access or interface technology 2, and/or judges whether to directly transmit a specific message to a base station discovered by the multi-mode terminal according to the measurement result and a co-site/co-coverage relation between the cell of the carrier frequency 1 and the cell of the carrier frequency 2 and/or radio access or interface technology 2. Wherein the judgement is to compare the measurement result with a preset threshold value I and a threshold value II; if the measurement result is greater than the threshold value I and the threshold value II, the multi-mode terminal measures the carrier frequency 2 and/or radio access or interface technology 2; or, if the measurement result is not less than the threshold value II, the multi-mode terminal directly transmits a specific message to a base station discovered by it;

The specific message may be a switching or activating message;

and/or the multi-mode terminal submits the deduced measurement result of the cell of the carrier frequency 2, and the measurement result indicating the cell of the carrier frequency 2 is deduced. When the carrier frequencies 2 /radio access or interface technologies 2 of the adjacent base stations discovered by the multi-mode terminal are in an energy saving state (such as power off, or dormant state, or DTX), after the serving base station receives an indication or a submit of the multi-mode terminal, the Macro base station transmits a message to the energy-saving base stations, so as to activate the carrier frequencies 2 /radio access or interface technologies 2 (the activating message can carry the measurement result of the carrier frequency 1 /radio access or interface technology 1 of the multi-mode terminal), to perform subsequent measurement and/or switching.

Preferably, the step that the multi-mode terminal prepares the communication operation with the carrier frequency 2 of the multi-mode base station may further include combination, for example, after receiving a state indication of the multi-mode base station, the multi-mode terminal judges a mode adopted to prepare the communication operation with the carrier frequency 2 of the multi-mode base station.

Wherein the state of the multi-mode base station can be visibly or invisibly indicated by the serving base station or the multi-mode base station; for example, the multi-mode terminal distinguishes whether the carrier frequency 2 /radio access or interface technology 2 of the multi-mode base station is in an energy saving state according to resources and/or sequences used by the discovery signal (the multi-mode terminal may acquire information of the resources and/or the sequences used by the discovery signal of the multi-mode base station in the energy saving state in advance); if so, the multi-mode terminal activates the carrier frequency 2/radio access or interface technology 2 of the multi-mode base station through the serving base station, or self-transmits a signal and/or a message to activate the carrier frequency 2 /radio access or interface technology 2 of the multi-mode base station; if not, the multi-mode terminal can directly measure and submit the carrier frequency 2 /radio access or interface technology 2. For another example, a load of the carrier frequency 2 /radio access or interface technology 2 of the multi-mode base station may affect the specific mode that the multi-mode terminal prepares the communication operation with the carrier frequency 2 of the multi-mode base station, and such influence may be either embodied on the decision of the multi-mode terminal (for example, the Receiving Signal Quality (RSRQ) is indirectly estimated according to the load and the RSRP) or embodied on the decision of a base station. In addition, the state of the multi-mode terminal may affect the specific preparation mode, for example, the state of the multi-mode terminal includes at least one of the following states: a service state, a moving state, and a power consumption/electric quantity state.

Embodiment III

Figure 8:
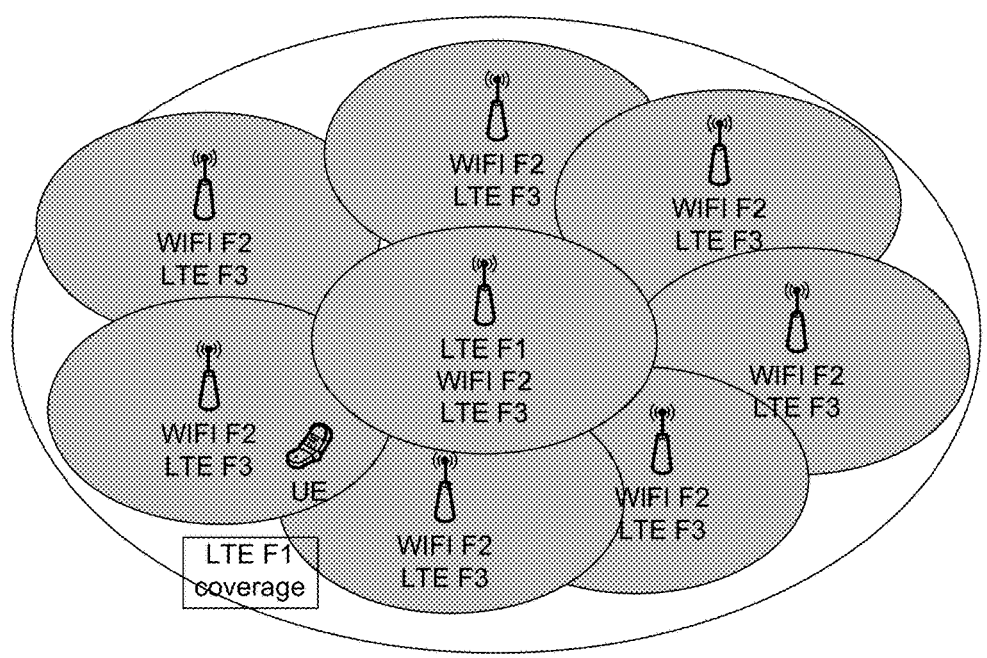
FIG. 8 is a structural diagram I illustrating the structures of a system in the embodiment III.
Figure 9:
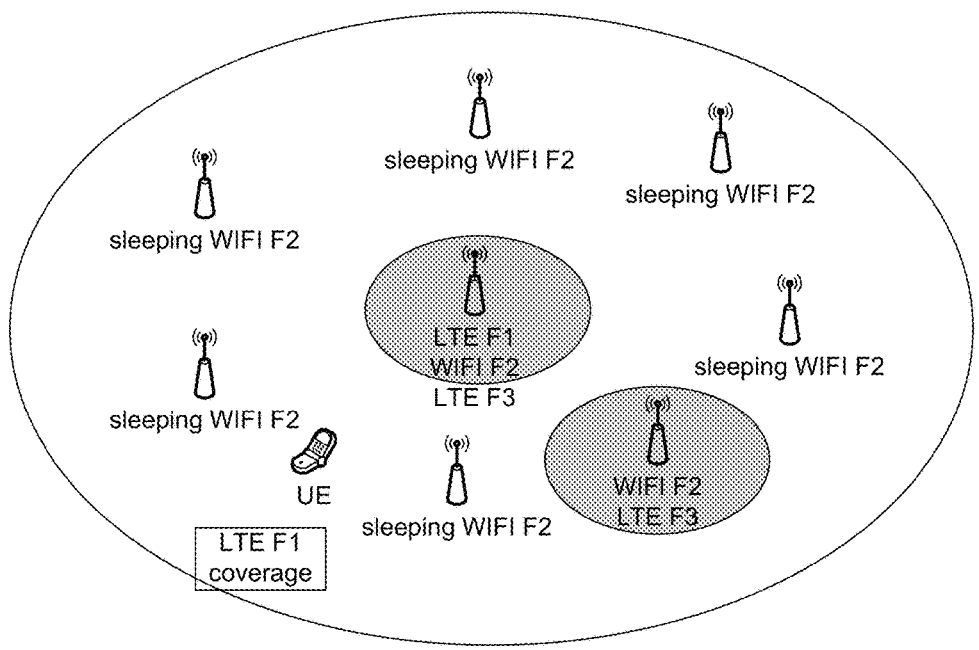
FIG. 9 is a structural diagram II illustrating the structures of a system in the embodiment III.

FIG. 8 is a diagram of a dense deployment of small base stations/small cells. As shown in FIG. 4, a small base station at the centre supports LTE F1 and WIFI F2, and small access points therearound support WIFI F2. The coverage of the LTE F1 cell of the small base station at the centre is substantially equivalent to a union of the coverage of all the small access points supporting WIFI F2. Therefore, the LTE F1 cell may be also regarded to be co-covered with an access point group supporting WIFI F2 (although not all the access points are co-sited). Such a scene can adopt a method of the example 1. When these small base stations/small cells are located under the coverage of the Macro cell, the scene may be also similar to a method of the example 2, so no repeated description will be given here. Similarly, the methods above can be applied to the scene as shown in FIG. 9, and a difference from FIG. 4 is that some WIFI APs are in a dormant state.

Figure 10:
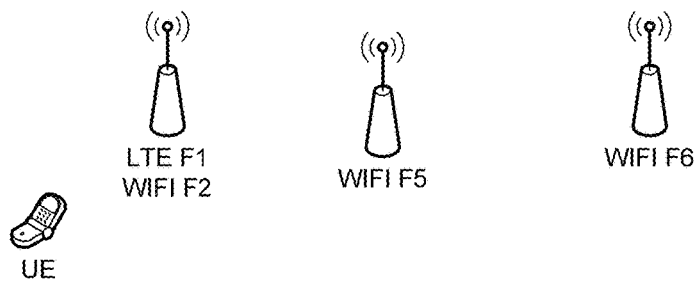
FIG. 10 is a structural diagram III illustrating the structures of a system in the embodiment III.

FIG. 10 is a diagram of an indoor deployment of a small base station/small cell. Small base stations at an indoor and outdoor intersection support LTE F1 and LTE F2, and access points therearound support WIFI F5 and WIFI F6. These nodes can be covered by a larger Macro cell (which is not drawn in the figures). A user needs to pass through the small base stations which are located at the indoor and outdoor intersection and support LTE F1 and LTE F2 when going to the outdoor from the indoor.

Figure 11:
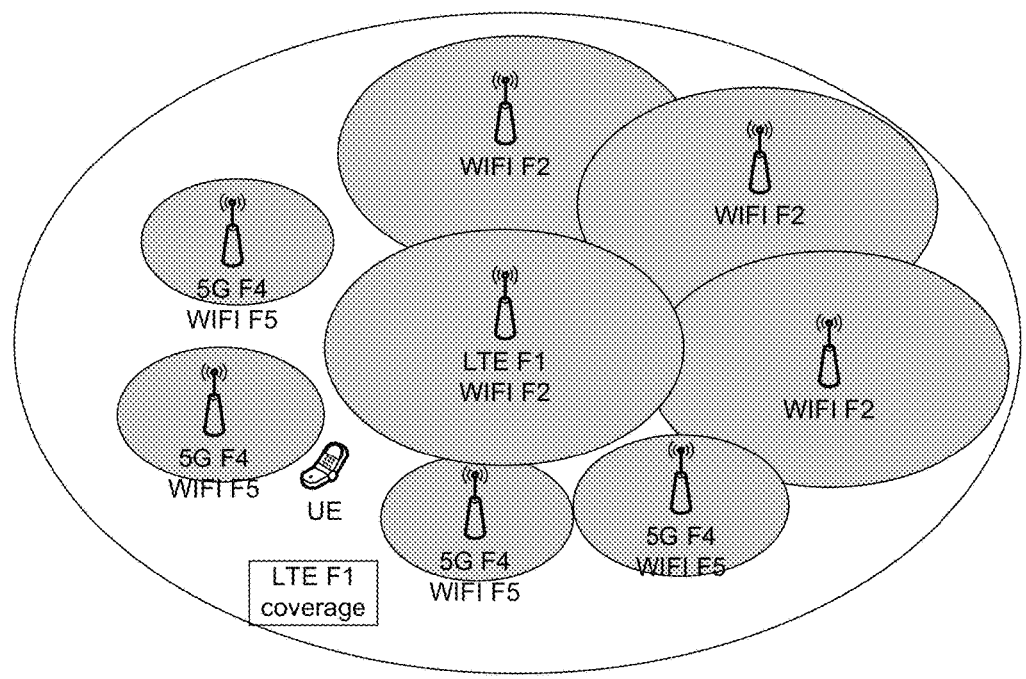
FIG. 11 is a structural diagram IV illustrating the structures of a system in the embodiment III.

FIG. 11 is a diagram of a deployment of a heterogeneous network. There are a plurality of small base stations or small access points providing smaller coverage under the coverage range of LTE F1, some of them supporting WIFI F2, and some supporting IMT-2020 F4 and WIFI F5. In the figure, all the nodes can be covered by a larger Macro cell (which is not drawn in the figure). It can be seen from the figure, there is WIFI covering probable 50% of an LTE F1-covered area (wherein there is WIFI F2 covering probable 40% of the area, and WIFI F4 covering 10% of the area); there is IMT-2020 covering probable 10% of the LTE F1-covered area.

Figure 12:
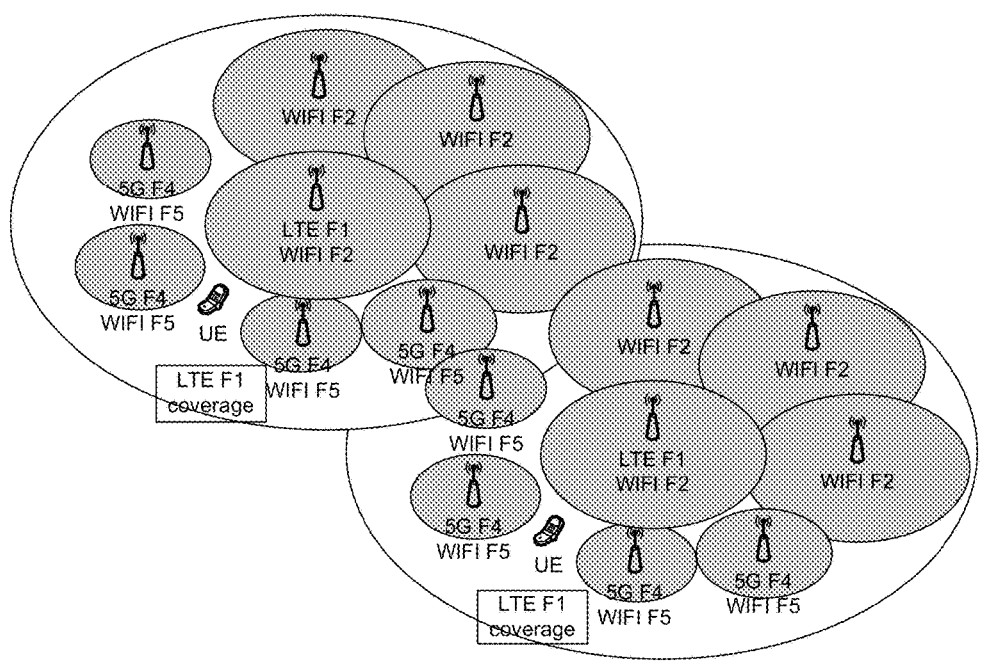
FIG. 12 is a structural diagram V illustrating the structures of a system in the embodiment III.

FIG. 12 is a diagram of a deployment of a heterogeneous network. Under the coverage range of two cells (which can be regarded as a cell set) of LTE F1, there are a plurality of small base stations or small access points providing a smaller coverage area, some of them supporting WIFI F2, and some supporting IMT-2020 radio access or interface technology F4 and WIFI F5; all the nodes in the figure can be covered (which is not shown in the figure) by a larger Macro cell. It can be seen from the figure, WIFI covers probable 60% of an area covered by the cells of LTE F1 (where WIFI F2 covers probable 50% of the area, and WIFI F4 covers 10% of the area); the IMT-2020 radio access or interface technology covers probable 10% of the area covered by the cell set of LTE F1.

Figure 13:
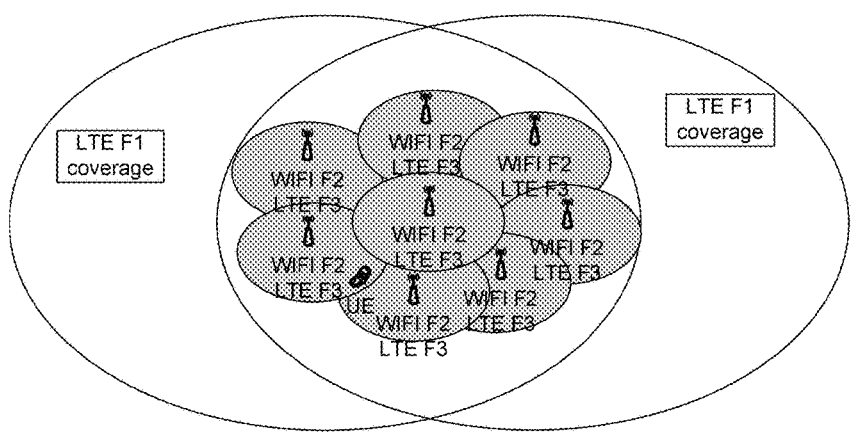
FIG. 13 is a structural diagram VI illustrating the structures of a system in the embodiment III.

FIG. 13 is a diagram of a deployment of a heterogeneous network. Under the overlapping coverage range of two cells of LTE F1 (or the edge areas), there are a plurality of small base stations or small access points providing a smaller coverage area, which support WIFI F2 and LTE F3. It can be seen from the FIG. 13, WIFI and LTE F3 cover probable 70% of an area covered by the two cells of LTE F1 in an overlapping manner.

By virtue of different radio access or interface technologies or different modes (such as FDD/TDD), the communication module in the multi-mode terminal can be completely independent or partially independent, and the communication module with a plurality of radio access or interface technologies/modes on may cause higher power consumption within unit time.

As shown in FIGS. 8 to 13, the coverage range of the specific radio access or interface technology/mode can be indirectly deduced by a larger communication radio access or interface technology/mode of a certain coverage range. That is, the discovering of a cell of a certain radio access or interface technology/mode may deduce discovering of a specific radio access or interface technology/mode, so that the communication modules of a plurality of radio access or interface technologies/modes cannot be switched on (so that the power consumption of the terminal within unit time can be reduced); by virtue of comparison, a less costly communication mode (such as a communication mode with a larger coverage range, or a communication mode with the same frequency as the current working carrier frequency of the multi-mode terminal, or a specific discovering signal, a discovering carrier frequency) can be easily measured/discovered, or a less costly communication mode can be measured/discovered, and a greater costly communication mode (such as a communication mode with a frequency/radio access or interface technology different from the current working carrier frequency/radio access or interface technology of the multi-mode terminal, and/or a communication mode with a smaller coverage range) which is difficultly measured/discovered can be discovered, or measured/discovered; a communication mode with a higher priority level can be discovered by a communication mode with a lower priority level, for example, the WLAN or the fifth-generation wireless communication technology is discovered by 3G or LTE; therefore, it encourages a user to use more service flow within a less costly communication mode service area.

EXAMPLE 1

A multi-mode terminal in an Idle-state receives WIFI coverage indication information broadcast by a (resident) cell; or, a multi-mode terminal in a connection-state receives WIFI coverage indication information transmitted by a (serving) cell.

Herein, the coverage indication information can be transmitted to an appointed multi-mode terminal in a broadcast system information message, or a unicast message such as an RRC reconfiguration message.

Herein, the appointed multi-mode terminal can transmit the information to one or more selected multi-mode terminals according to the capabilities of the multi-mode terminals saved therein.

Furthermore, the multi-mode terminal discovers a WIFI service area according to the received coverage indication information.

EXAMPLE 2

A multi-mode terminal in an Idle-state receives IMT-2020 coverage indication information Broadcast by a (resident) cell; or, a multi-mode terminal in a connection-state receives IMT-2020 coverage indication information transmitted by a (serving) cell.

Herein, the coverage indication information can be transmitted to an appointed multi-mode terminal in a broadcast system information message, or a unicast message such as an RRC reconfiguration message.

Furthermore, the multi-mode terminal discovers an IMT-2020 service area according to the received coverage indication information.

EXAMPLE 3

A multi-mode terminal in an Idle-state receives TDD mode coverage indication information broadcast by an (resident) FDD cell. A multi-mode terminal in a connection-state receives TDD mode coverage indication information transmitted by an (serving) FDD cell.

the multi-mode terminal discovers a TDD mode service area according to the received coverage indication information.

Herein, the coverage indication information can be transmitted to an appointed multi-mode terminal in a broadcast system information message, or a unicast message such as an RRC reconfiguration message.

Similarly, the multi-mode terminal can also discover an FDD mode service area according to FDD mode coverage indication information transmitted by a TDD cell.

EXAMPLE 4

A multi-mode terminal in an Idle-state receives specific cell WIFI coverage indication information broadcast by a (resident) cell. A multi-mode terminal in a connection-state receives specific cell WIFI coverage indication information transmitted by a (serving) cell. Herein the information can be transmitted to an appointed multi-mode terminal in a broadcast system information message, or a unicast message such as an RRC reconfiguration message.

Herein, in the specific cell WIFI coverage indication information, an identity, such as a PCI, an EARFCN and a CGI, of the cell expresses a specific cell.

The multi-mode terminal discovers the specific cell (for example via scanning or measurement, wherein a cell identification process is involved) and thus the multi-mode terminal discovers a WIFI service area.

Similarly, according to a specific radio access or interface technology or mode (such as an IMT-2020 radio access or interface technology, or a high-frequency-band communication carrier frequency/radio access or interface technology, or a TDD mode, or an FDD mode) coverage indication information, transmitted by a cell, of a specific base station, the multi-mode terminal can also discover an IMT-2020 service area, or a high-frequency-band communication carrier frequency/radio access or interface technology service area, or a TDD mode service area, or an FDD mode service area.

EXAMPLE 5

A multi-mode terminal in an Idle-state receives specific base station WIFI coverage indication information broadcast by a (resident) cell. A multi-mode terminal in a connection-state receives specific base station WIFI coverage indication information transmitted by a (serving) cell (the information can be included in a broadcast system message information or a unicast message such as an RRC reconfiguration message). Herein, the specific base station is indicated through an identity of the base station, such as an eNB ID or an MAC address, or an identity of one or more cells corresponding to the base station.

The multi-mode terminal discovers the specific base station (for example via scanning or measurement, wherein a base station identification process is involved) and thus the multi-mode terminal discovers a WIFI service area.

Similarly, according to a specific radio access or interface technology or mode (such as an IMT-2020 radio access or interface technology, or a high-frequency-band communication carrier frequency/radio access or interface technology, or a TDD mode, or an FDD mode) coverage indication information, transmitted by a cell, of the specific base station, the multi-mode terminal can also discover an IMT-2020 service area, or a high-frequency-band communication carrier frequency/radio access or interface technology service area, or a TDD mode service area, or an FDD mode service area.

EXAMPLE 6

A multi-mode terminal in an Idle-state receives specific cell set WIFI coverage indication information broadcast by a (resident) cell. A multi-mode terminal in a connection-state receives specific cell set WIFI coverage indication information transmitted by a (serving) cell (the information can be included in a broadcast system message information or a unicast message such as an RRC reconfiguration message). Herein, the specific cell set is indicated through an identity range of the cell, such as a PCI range, a carrier frequency number (such as an EARFCN), and a CGI range.

The multi-mode terminal discovers a cell belonging to the specific cell set (for example via scanning or measurement, wherein a cell identification process is involved, and identities of one or more cells are in the indicated cell identity range), so the multi-mode terminal discovers a WIFI service area.

Similarly, according to a specific radio access or interface technology or mode (such as an IMT-2020 radio access or interface technology, or a high-frequency-band communication carrier frequency/radio access or interface technology, or a TDD mode, or an FDD mode) coverage indication information, transmitted by a cell, of the specific base station, the multi-mode terminal can also discover an IMT-2020 service area, or a high-frequency-band communication carrier frequency/radio access or interface technology service area, or a TDD mode service area, or an FDD mode service area. Similarly, the specific radio access or interface technology or mode coverage indication information of a specific base station can be further configured to assist the terminal to discover a service area of a specific radio access or interface technology or mode.

EXAMPLE 7

A multi-mode terminal in an Idle-state receives specific carrier frequency WIFI coverage indication information broadcast by a (resident) cell. A multi-mode terminal in a connection-state receives specific carrier frequency WIFI coverage indication information transmitted by a (serving) cell (the information can be included in a broadcast system message information or a unicast message such as an RRC reconfiguration message).

The specific carrier frequency is indicated by a carrier frequency number (such as an EARFCN of the EUTRAN).

The multi-mode terminal discovers the specific carrier frequency (for example via scanning or measurement), so the multi-mode terminal discovers a WIFI service area.

Similarly, according to a specific radio access or interface technology or mode (such as an IMT-2020 radio access or interface technology, or a high-frequency-band communication carrier frequency/radio access or interface technology, or a TDD mode, or an FDD mode) coverage indication information, transmitted by a cell, of the specific base station, the multi-mode terminal can also discover an IMT-2020 service area, or a high-frequency-band communication carrier frequency/radio access or interface technology service area, or a TDD mode service area, or an FDD mode service area.

EXAMPLE 8

The specific radio access or interface technology or mode (such as WIFI, a high-frequency-band communication carrier frequency/radio access or interface technology, an IMT-2020 radio access or interface technology, or a TDD mode, or an FDD mode) coverage indication information in the examples 1 to 3 can further be: condition discover parameters, such as measurement evaluation parameters.

If the multi-mode terminal compares the Signal Receiving Power (such as RSRP) of the serving cell (or the resident cell), and/or the Signal Receiving Quality (RSRQ), or the Signal Receiving Strength (RSSI) with the measurement evaluation parameter, and an appointed condition is met, the multi-mode terminal discovers a service area of the specific radio access or interface technology or mode. Herein the appointed condition can be that the RSRP is greater than the measurement evaluation parameter.

EXAMPLE 9

The specific radio access or interface technology or mode (such as WIFI, a high-frequency-band communication carrier frequency/radio access or interface technology, an IMT-2020 radio access or interface technology, or a TDD mode, or an FDD mode) coverage indication information in the examples 4 to 7 can further be: condition discover parameters, such as measurement evaluation parameters.

In the process that the multi-mode terminal discovers the specific cell, or the specific cell set, or the specific base station, or the specific base station set, or the specific carrier frequency, if an appointed condition is met, it is determined that the multi-mode terminal discovers a service area of the specific radio access or interface technology or mode.

Wherein the appointed condition is that the signal receiving power (such as RSRP) of the cell or the base station or the carrier frequency, and/or the RSRQ or the RSSI is compared with the measurement evaluation parameter, and when the appointed condition is met (for example, the RSRP is greater than the measurement valuation parameter) or a group of conditions (such as aiming at the scene of Fig. X, the RSRP of the cell A is less than the measurement evaluation parameter 1 and the RSRP of the cell B is less than the measurement evaluation parameter 2) is met.

EXAMPLE 10

The coverage indication information in the examples 4 to 7 and the example 9 is from an access network (such as a cell/base station). Actually, the multi-mode terminal can receive the similar coverage indication information (which is generated by a core network and transmitted to the terminal through the access network) from a network element of the core network such as an Active Network Discovery and Selection Function (ANDSF), to discover a service area of the specific radio access or interface technology or mode (such as WIFI, an IMT-2020 radio access or interface technology, or a high-frequency-band communication carrier frequency/radio access or interface technology, or a TDD mode, or an FDD mode). Therefore, no repeated description will be given herein.

EXAMPLE 11

The coverage indication information in the examples 1 to 10 may further include a coverage ratio or a discover ratio, to indicate a ratio (or whether the ratio is large, medium or small) of actually covered areas of the specific radio access or interface technology or mode to the discovered areas of the specific radio access or interface technology or mode.

For example, the WIFI coverage indication information further includes the 80% coverage ratio, which means there are actually 80% of WIFI-covered areas in the WIFI service areas discovered by the method above, or the accessible probability after WIFI AP scanning is actually 80% in the WIFI service areas discovered by the method above (in this way, the coverage ratio is equivalent to a ratio of actually discovered to nominal discovered, that is the discover probability).

The coverage ratio can be configured to assist the multi-mode terminal or the user to do subsequent judgment and decisions. For example, the multi-mode terminal judges whether to start scanning/measurement on the specific radio access or interface technology or specific mode according to the coverage ratio (for example, the multi-mode terminal does not start scanning/measurement unless the coverage ratio is greater than a specific threshold; for another example, the multi-mode terminal generates a random number; when the coverage ratio is greater than the random number, scanning/measurement is started; the generation of the random number may be regular or triggered by an event); or determines a period/frequentness of scanning/measurement on the specific radio access or interface technology or the specific mode, and/or determine the continuous judgment or delay time for discovering the specific cell (or the specific cell set or the specific base station or the specific base station set or the specific carrier frequency) (for example, only if the measurement signal strength of the specific cell is greater than the specific threshold for 1 second, the service area of the specific radio access or interface technology or the specific mode is discovered, or only if the specific cell is discovered for 1 second, the service area of the specific radio access or interface technology or the specific mode is discovered). The coverage ratio can be further provided for the user through the user interface, so that the user can decide whether to start the communication module of the specific radio access or interface technology or mode.

EXAMPLE 12

The coverage indication information in the examples 1 to 10 may further include a value parameter configured to control discovering of the specific radio access or interface technology/mode or the subsequent processing. Only if the value parameter is greater than the specific threshold, the multi-mode terminal discovers the service area of the specific radio access or interface technology/mode, or further starts scanning/measurement. For another example, the multi-mode terminal generates a random number. When the value parameter is greater than the random number, the service area of the specific radio access or interface technology/mode is discovered or scanning/measurement is started. The generation of the random number may be regular or triggered by an event. The coverage indication information may further include a parameter configured to determine a period/frequentness of scanning/measurement on the specific radio access or interface technology or the specific mode, and/or a parameter configured to determine the continuous judgment or delay time for discovering the specific cell (or the specific cell set or the specific base station or the specific base station set or the specific carrier frequency) (for example, only if the specific cell is discovered for 1 second, the service area of the specific radio access or interface technology or the specific mode is discovered).

EXAMPLE 13

In the methods of the examples 1 to 11, the coverage indication information of the specific radio access or interface technology/mode may further include: frequency band information (such as 2.4G frequency band of WIFI, 5G frequency band, and a Band number of an IMT spectrum), carrier frequency information (such as the EARFCN), cell information, Service Set (SS) information and operational network information (such as a PLMN identity) of the specific radio access or interface technology/mode, and may further include load information, capability information and energy saving state information of the specific radio access or interface technology/mode, so as to process subsequent judgment or decision of the terminal or the user, for example, the terminal judges whether to access to the radio access or interface technology/mode in advance.

Under the condition of no conflicts, the methods of the above examples can be combined. In some circumstances (such as equipment to equipment communication, neighbouring communication and relay communication), the user equipment can be used as an access point configured to forward data between a network and the multi-mode terminals or between one multi-mode terminal and another multi-mode terminal or to directly interact data with other user equipment. The multi-mode user equipment serving as the access point is also suitable for the method for discovering a multi-mode base station/a multi-mode access point in the present disclosure.

The above is only preferred embodiments of the present disclosure, and not intended to limit the scope of protection of the present disclosure.

The invention claimed is:
1. A method for assisting a multi-mode terminal to discover communication opportunities, comprising:
receiving, by the multi-mode terminal, coverage indication information relevant to a second communication mode and transmitted by a network side; and
discovering, by the multi-mode terminal, a communication opportunity based on the second communication mode according to the coverage indication information;
wherein the second communication mode is: one or multiple carrier frequencies and/or one or multiple radio access or interface technologies other than a first communication mode;
the first communication mode is a carrier frequency or radio access or interface technology in which the multi-mode terminal is currently working;
a base station adopts the first communication mode and the second communication mode to execute joint transmission with the multi-mode terminal; and a communication priority level of the second communication mode is higher than that of the first communication mode.

2. The method according to claim 1, wherein the step of receiving, by the multi-mode terminal, coverage indication information relevant to the second communication mode and transmitted by the network side comprises:
receiving, by the multi-mode terminal, the coverage indication information transmitted by a serving base station and indicating that a first communication mode and the second communication mode of a multi-mode base station have the same coverage.

3. The method according to claim 2, further comprising: measuring, by the multi-mode terminal, a first communication mode signal of the multi-mode base station; and the first communication mode signal includes: a synchronous signal, a discovery signal, a reference signal and a beacon.

4. The method according to claim 1, wherein the coverage indication information indicating that the first communication mode and the second communication mode of the multi-mode base station have the same coverage is:
information of cells or access points of multiple carrier frequencies and/or multiple radio access or interface technologies of the multi-mode base station, which comprises identity information of the base station, and/or geographical position identity information, and/or coverage information; or
indicated by identities or the range of identities of the cells/access points which are co-sited or co-covered; or
indicated by capability information of the cells/access points; or
two or multiple carrier frequencies and/or radio access or interface technologies of the same operator which are co-sited or co-covered.

5. The method according to claim 4, wherein
the coverage indication information further indicates an offset value of signal receiving power;
the step of discovering the communication opportunity based on the second communication mode comprises:
judging, by the multi-mode terminal, whether to perform communication based on the second communication mode by using the offset value in combination with a first communication mode signal measurement result.

6. The method according to claim 4, wherein the step of discovering the communication opportunity based on the second communication mode comprises:
measuring, by the multi-mode terminal, a second communication mode signal according to a result obtained by measuring the first communication mode signal of the multi-mode base station, so as to judge whether to perform communication based on the second communication mode; or,
submitting, by the multi-mode terminal, a measurement result to the serving base station, and configuring, by the serving base station, second communication mode signal measurement for the multi-mode terminal according to the measurement result, and/or switching/redirecting the multi-mode terminal to the second communication mode, and/or performing joint transmission with the multi-mode terminal, by a network side, by adopting the first communication mode and the second communication mode; or
transmitting, by the multi-mode terminal, a message to the serving base station, and configuring, by the serving base station, measurement on the second communication mode for the multi-mode terminal, and/or judging, by the serving base station, according to the message, whether to transmit the message to the multi-mode base station discovered by the multi-mode terminal, wherein the message transmitted from the multi-mode terminal to the serving base station includes at least one of the following information: indication information close to the service range of the second communication mode, the result obtained by measuring the first communication mode signal, and a deduced result of measurement on the second communication mode signal; or
automatically selecting, by the multi-mode terminal, to adopt the second communication mode for communication; or
indicating, by the multi-mode terminal, a user that the second communication mode of the multi-mode base station is serviceable, and executing communication by using the second communication mode according to manual selection from the user.

7. The method according to claim 2, further comprising: before the step of receiving, by the multi-mode terminal, coverage indication information relevant to the second communication mode and transmitted by the network side,
acquiring, by the serving base station, information that adjacent base stations are multi-mode base stations or acquiring information that a plurality of adjacent cells are co-sited or co-covered through pre-configuration, or through a network management system, or through interfaces between the base stations.

8. The method according to claim 1, wherein the coverage indication information relevant to the second communication mode comprises a coverage ratio.

9. The method according to claim 8, wherein the coverage ratio is configured to assist the multi-mode terminal or a user to make a subsequent judgment;
a method of the judgment comprises at least one of the following steps:
judging, by the multi-mode terminal, according to the coverage ratio, whether to start scanning/measurement on the second communication mode signal;
determining, by the multi-mode terminal, according to the coverage ratio, a period/frequency of the scanning/measurement on the second communication mode signal, and/or determining continuous judgment time for discovering a service area of the second communication mode; and
providing, by the multi-mode terminal, the coverage ratio for the user, so that the user can determine whether to start a communication module with a specific radio access or interface technology or mode.

10. The method according to claim 8, wherein the coverage indication information relevant to the second communication mode comprises: cell or cell set information; or, carrier frequency information; or frequency band information, carrier frequency information, cell information, service set information and operational network information of a specific radio access or interface technology/mode, wherein the coverage indication information relevant to the second communication mode further comprises at least one of the following information: measurement evaluation parameter information, load information, capability information and energy saving state information.

11. The method according to claim 10, wherein the step of discovering, by the multi-mode terminal, the communication opportunity based on the second communication mode according to the coverage indication information comprises:
in the case of associating in default the coverage indication information with a serving cell of the multi-mode terminal, discovering, by the multi-mode terminal, a service area of the second communication mode; or in the case of discovering a cell or cell set in the coverage indication information, discovering, by the multi-mode terminal, a service area of the second communication mode; or in the case of discovering a carrier frequency indicated in the coverage indication information, discovering, by the multi-mode terminal, a service area of the second communication mode; or judging, by the multi-mode terminal, whether a service area of the second communication mode is discovered according to the measurement evaluation parameter information.

12. The method according to claim 10, wherein the multi-mode terminal judges whether to execute communication based on the second communication mode according to the frequency band information, the carrier frequency information, the cell information, the service set information, the operational network information of the specific radio access or interface technology/mode, the load information, the capability information and the energy saving state information.

13. The method according to claim 8, wherein the second communication mode at least comprises one of the following modes: WIFI, an IMT-2020 communication radio access or interface technology, a high-frequency band communication carrier frequency/radio access or interface technology, a Frequency Division Duplex (FDD) communication mode and a Time Duplex Division (TDD) communication mode.

14. A multi-mode terminal, comprising: a processor and a memory for storing instructions executed by the processor, wherein, the processor is configured to:

receive coverage indication information relevant to a second communication mode; and discover a communication opportunity based on the second communication mode according to the received coverage indication information;

wherein the second communication mode is: one or multiple carrier frequencies and/or one or multiple radio access or interface technologies other than a first communication mode; and the first communication mode is a carrier frequency or radio access or interface technology in which the multi-mode terminal is currently working;

a base station adopts the first communication mode and the second communication mode to execute joint transmission with the multi-mode terminal; and a communication priority level of the second communication mode is higher than that of the first communication mode.

15. The multi-mode terminal according to claim 14, wherein the processor is further configured to be capable of executing the stored program instructions to receive the coverage indication information transmitted by a serving base station and indicating that a first communication mode and the second communication mode of a multi-mode base station have the same coverage.

16. The multi-mode terminal according to claim 15, the processor is further configured to be capable of executing the stored program instructions to measure a first communication mode signal of the multi-mode base station, and receive a measurement result of the first communication mode.

17. The multi-mode terminal according to claim 16, wherein the first communication mode is a carrier frequency or radio access or interface technology signal which is the same as the current working carrier frequency or radio access or interface technology of the multi-mode terminal, wherein the signal includes but is not limited to: a synchronous signal, a discovery signal, a reference signal and a beacon; and wherein the second communication mode is: one or multiple carrier frequencies and/or one or multiple radio access or interface technologies other than the first communication mode.

18. A base station, comprising: a processor and a memory for storing instructions executed by the processor, wherein the processor is configured to transmit coverage indication information relevant to a second communication mode;

wherein the second communication mode is: one or multiple carrier frequencies and/or one or multiple radio access or interface technologies other than a first communication mode; and the first communication mode is a carrier frequency or radio access or interface technology in which a multi-mode terminal is currently working;

the base station adopts the first communication mode and the second communication mode to execute joint transmission with the multi-mode terminal; and a communication priority level of the second communication mode is higher than that of the first communication mode.

19. The base station according to claim 18, wherein, the processor is further configured to be capable of executing the stored program instructions to transmit the coverage indication information indicating that a first communication mode and the second communication mode of a multi-mode base station have the same coverage; or transmit a coverage ratio of the second communication mode.

* * * * *